United States Patent [19]
Kondo et al.

[11] Patent Number: 5,886,794
[45] Date of Patent: Mar. 23, 1999

[54] PICTURE ENCODING APPARATUS

[75] Inventors: Tetsujiro Kondo; Yasuhiro Fujimori; Kunio Kawaguchi, all of Tokyo, Japan

[73] Assignee: Sony Corporation, Tokyo, Japan

[21] Appl. No.: 956,016

[22] Filed: Oct. 22, 1997

Related U.S. Application Data

[63] Continuation of Ser. No. 411,600, filed as PCT/JP94/014,26, Aug. 30, 1994, Pat. No. 5,767,986.

[30] Foreign Application Priority Data

| Aug. 30, 1993 | [JP] | Japan | 5-239140 |
| Sep. 22, 1993 | [JP] | Japan | 5-259206 |
| Sep. 30, 1993 | [JP] | Japan | 5-268095 |
| Oct. 4, 1993 | [JP] | Japan | 5-273113 |

[51] Int. Cl.$^6$ .......... H04N 1/419; H04N 1/417; H04N 1/41; G06K 9/36
[52] U.S. Cl. .......... 358/428; 358/261.1; 358/261.2; 358/261.3; 358/262.1; 358/426; 382/232; 382/230; 382/242; 382/248
[58] Field of Search .......... 358/261.1, 261.3, 358/426, 428, 433, 448, 261.2, 262.1, 430, 432; 382/232, 238, 240, 248, 250; 348/400, 401, 402, 408, 416

[56] References Cited

U.S. PATENT DOCUMENTS

| 4,849,810 | 7/1989 | Ericsson | 348/416 |
| 5,122,873 | 6/1992 | Golin | 348/416 |
| 5,253,075 | 10/1993 | Sugiyama | 358/433 |
| 5,282,255 | 1/1994 | Bovik et al. | 358/433 |
| 5,351,095 | 9/1994 | Kerdranvat | 348/416 |

*Primary Examiner*—Edward L. Coles
*Assistant Examiner*—Mark Wallerson
*Attorney, Agent, or Firm*—Frommer Lawrence & Haug, LLP.; William S. Frommer; Dennis M. Smid

[57] ABSTRACT

A picture encoding apparatus and the method in which the quantization step width of the lower hierarchy data having a resolution higher than that of the upper hierarchy data is determined for each predetermined block of respective hierarchy data based on the quantization step width determined by the upper hierarchy data having a low resolution, so that the additional code indicating the characteristics of quantizer can be omitted thereby the compression efficiency can be improved and the deterioration of picture quality can be reduced when picture data is hierarchical-encoded.

24 Claims, 27 Drawing Sheets

| STANDARD PICTURES | DIVISION INHIBITING CONDITION TO LOWER HIERARCHY (MAXIMUM DIFFERENCE DATA ≦ THRESHOLD VALUE) | | | | | |
|---|---|---|---|---|---|---|
| | ERROR≦1 | ERROR≦2 | ERROR≦3 | ERROR≦4 | ERROR≦5 | ERROR≦6 |
| SKIN-COLOR CHART | 0.56 | 0.29 | 0.21 | 0.19 | 0.17 | 0.15 |
| YACHT HARBOR | 0.86 | 0.74 | 0.65 | 0.59 | 0.53 | 0.48 |
| SWEATER AND BAG | 0.81 | 0.59 | 0.44 | 0.35 | 0.29 | 0.24 |
| EIFFEL TOWER | 0.59 | 0.38 | 0.30 | 0.26 | 0.24 | 0.22 |
| HAT SHOP | 0.82 | 0.65 | 0.53 | 0.45 | 0.40 | 0.35 |
| LOVERS IN SNOW | 0.65 | 0.35 | 0.23 | 0.18 | 0.14 | 0.12 |
| INFORMATION BOARD FOR TOURIST | 0.75 | 0.60 | 0.53 | 0.47 | 0.43 | 0.40 |
| TULIP GARDEN | 0.91 | 0.87 | 0.83 | 0.79 | 0.75 | 0.72 |
| CHROMAKEY CHART | 0.50 | 0.30 | 0.25 | 0.22 | 0.20 | 0.18 |
| AVERAGE | 0.72 | 0.53 | 0.44 | 0.39 | 0.35 | 0.32 |

FIG. 4

| STANDARD PICTURES | ORIGINAL SIGNAL | FIRST HIERARCHY | SECOND HIERARCHY | THIRD HIERARCHY | FOURTH HIERARCHY | FIFTH HIERARCHY |
|---|---|---|---|---|---|---|
| SKIN-COLOR CHART | 30 | 4 | 5 | 5 | 7 | 30 |
| YACHT HARBOR | 58 | 13 | 15 | 16 | 17 | 49 |
| SWEATER AND BAG | 56 | 6 | 7 | 8 | 11 | 53 |
| EIFFEL TOWER | 52 | 8 | 9 | 9 | 10 | 49 |
| HAT SHOP | 56 | 8 | 12 | 15 | 18 | 49 |
| LOVERS IN SNOW | 56 | 4 | 6 | 8 | 10 | 54 |
| INFORMATION BOARD FOR TOURIST | 68 | 11 | 15 | 18 | 19 | 61 |
| TULIP GARDEN | 52 | 17 | 17 | 17 | 16 | 39 |
| CHROMAKEY CHART | 55 | 8 | 9 | 9 | 10 | 52 |
| AVERAGE | 54 | 9 | 11 | 12 | 13 | 48 |

FIG. 5

| X0 | X1 | X2 |
|----|----|----|
| X7 | m  | X3 |
| X6 | X5 | X4 |

FIG. 26

|    | X0 |    |
|----|----|----|
| X3 | m  | X1 |
|    | X2 |    |

FIG. 28

| X0 | X1 | X2 | X3 | X4 |
|----|----|----|----|----|
|    |    |    |    |    |
|    |    | m  |    |    |
|    |    |    |    |    |
|    |    |    |    |    |

FIG. 29

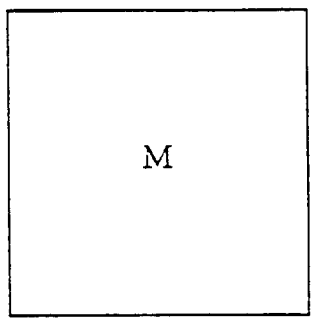
UPPER HIERARCHY DATA OF VIRTUAL UPPERMOST HIERARCHY
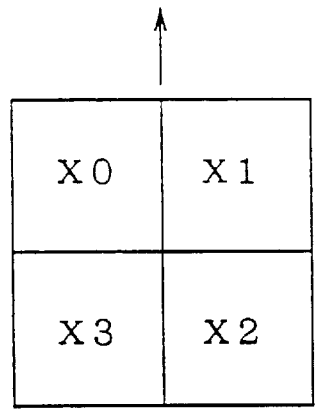
POSITION OF UPPERMOST HIERARCHY
FIG. 30(A)
FIG. 30(B)

5,886,794

PICTURE ENCODING APPARATUS

This application is a continuation of application Ser. No. 08/411,600, filed as PCT/JP94/01426, Aug. 30, 1994, now U.S. Pat. No. 5,767,986.

TECHNICAL FIELD

This invention relates to a picture encoding apparatus and the method, and is applicable to a picture encoding apparatus, for example, for dividing a predetermined picture data into a plurality of picture data having various resolutions and encoding it.

BACKGROUND ART

Heretofore, a picture encoding apparatus for encoding input picture data using a method of hierarchy encoding, for example, pyramid encoding has been provided. In this type of picture encoding apparatus, a first hierarchy data being input picture data of high resolution, a second hierarchy data of which its resolution is lower than that of the first hierarchy data, and a third hierarchy data of which its resolution is lower than that of the second hierarchy data, are sequentially and recursively formed. The plurality of hierarchy data are transmitted through one transmitting path being a communicating path or a recording/reproducing route.

In a picture decoding apparatus for decoding this plurality of hierarchy data, all of the plural picture data can be decoded, in addition to this, one of the desired hierarchy data can be selected and decoded in accordance with the resolution of the corresponding television monitor or the like. In this manner, only the desired hierarchy data is decoded out of the plurality of hierarchy data, so that the desired picture data can be obtained with the minimum amount of transmitting data at need.

Here, as shown in FIG. 1, in the hierarchy encoding, a picture encoding apparatus 1 for actualizing for example, four hierarchical-encoding, has decimating filters 2, 3, and 4 of three hierarchies and interpolating filters 5, 6, and 7. The input picture data D1 is passed through the decimating filters 2, 3, and 4 of the respective stages to sequentially form reduced picture data D2, D3, and D4 having a lower resolution, and the reduced picture data D2, D3, and D4 are passed through the interpolating filters 5, 6, and 7 to change the resolutions of those data to that before reducing.

Outputs D2 to D4 of the respective decimating filters 2 to 4 and outputs D5 to D7 of the respective interpolating filters 5 to 7 are input to difference circuits 8, 9, and 10 respectively, in order to generate difference data D8, D9, and D10. As a result, in the picture encoding apparatus 1, the data quantity of hierarchy data and the signal power are reduced. Here, the difference data D8 to D10 and the reduced picture data D4 have the sizes of 1, ¼, 1/16, and 1/64 respectively in the areas.

The difference data D8 to D10 obtained from the difference circuits 8 to 10 and the reduced picture data D4 obtained from the decimating filter 4, are encoded by respective encoders 11, 12, 13, and 14 and are performed compression processing. As a result, first, second, third, and fourth hierarchy data D11, D12, D13, and D14 which have different resolutions respectively are sent from the respective encoders 11, 12, 13, and 14 to a transmitting path in a predetermined sequence.

Thus transmitted first through fourth hierarchy data D11 through D14 are decoded by a picture decoding apparatus 20 shown in FIG. 2. That is, the first through fourth hierarchy data D11 through D14 are decoded by decoders 21, 22, 23, and 24 respectively, so that the fourth hierarchy data D24 is output from the decoder 24.

Further, in an adding circuit 29, the output of the decoder 23 is added to the interpolating data of the fourth hierarchy data D24 obtained from an interpolating filter 26, to restore the third hierarchy data D23. Similarly, in an adding circuit 30, the output of the decoder 22 is added to the interpolating data of the third hierarchy data D23 obtained from an interpolating filter 27, to restore the second hierarchy data D22. Further, in an adding circuit 31, the output of the decoder 21 is added to the interpolating data of the second hierarchy data D22 obtained from an interpolating filter 28, to restore the first hierarchy data D21.

However, in a picture encoding apparatus realizing the above method of hierarchy encoding, the input picture data is divided into a plurality of hierarchy data and encoding it, hence, the amount of data of the hierarchy component is increased necessarily, as a result, it arises that compression efficiency decreases comparing with the case of using the high-efficiency encoding system in which hierarchy encoding is not used. Further, there is a problem that when improving the compression efficiency, the deterioration of picture quality occurs due to the respective quantizers applied to the hierarchy data.

DISCLOSURE OF INVENTION

Considering the above points, this invention provides a picture encoding apparatus such that when picture data is encoded hierarchically, the compression efficiency can be improved, and deterioration of picture quality can be reduced.

To solve such problems, according to this invention, as a first embodiment, a picture encoding apparatus 40 for encoding input picture data D31 to generate a plurality of hierarchy data D51 to D55 which have recursively various resolutions, comprises: means 53C, 55C, . . . , 53D, 55D, . . . for determining the quantization characteristic of the lower hierarchy data which has a resolution higher than that of the upper hierarchy data based on the activity of the upper hierarchy data having lower resolution in order to quantize respective hierarchy data D44, D43, D42, and D41; and a quantizing means 53A, 55A, . . . for quantizing respective hierarchy data in accordance with the determined quantizing characteristic.

Further, according to this invention, as a second embodiment, the picture encoding apparatus 40 for sequentially encoding input picture signal D1 to generate a plurality of hierarchy data D51 to D55 which have recursively various resolutions, comprises: means 53C, 55C, . . . , 53D, 55D, . . . for determining the quantized value of the hierarchy data in the block to be quantized based on the quantization step width E0, E1, E2, or E3 determined by the upper hierarchy data having a resolution lower than that of the hierarchy data D44, D43, D42, or D41 in the block to be quantized for each block corresponding to one another in each hierarchy, in order to quantize the hierarchy data D44, D43, D42, D41 respectively; and a quantizing means 53C, 55C, . . . , 53D, 55D, . . . for determining the quantization step width E0, E1, E2, or E3 of the lower hierarchy data which have a resolution higher than that of the hierarchy data in the block to be quantized.

Further, according to this invention, as a third embodiment, a picture encoding apparatus 60 for sequentially encoding input picture signal to generate a plurality of hierarchy data D51 to D55 which have recursively various resolutions, comprises: means 53C, 55C, . . . , 53D, 55D, . . . for determining the quantized value of the hierarchy data in the block to be quantized based on the quantization step width E0, E1, E2, or E3 determined by the upper hierarchy data having a resolution lower than that of the hierarchy data D44, D43, D42, or D41 in the block to be quantized in order to quantize the respective hierarchy data D44, D43, D42, D41, and for determining the quantization step width E0, E1, E2, or E3 of the lower hierarchy data having a resolution higher than that of the upper hierarchy data based on a historical information of the distribution of the quantized value of the hierarchy data upper than the lower hierarchy data having a resolution higher than that of the hierarchy data in the block to be quantized.

Further, according to this invention, as a fourth embodiment, a picture encoding apparatus 70 for encoding input picture data D31 to generate a plurality of hierarchy data D51 to D55 which have recursively various resolutions, comprises: determination means 53E, 55E, . . . for determining the number of quantizing bits of the lower hierarchy data having a resolution higher than that of the hierarchy data in the block to be quantized for each block corresponding to one another between hierarchies, based on the quantization step width E0, E1, E2, or E3 determined by the upper hierarchy data having a resolution lower than that of the hierarchy data in the block to be quantized; and quantizing means 53A, 55A, . . . for quantizing respective hierarchy data in accordance with the number of the determined quantizing bits.

Further, according to this invention, as a fifth embodiment, a picture encoding apparatus 80 for encoding the input picture data D31 to successively generate a plurality of hierarchy data D51 to D55 having various different resolutions recursively comprises: means 49, 51, 53, 55, 57, and 81 for determining the quantization step width of the lower hierarchy data D35 having lower resolution than that of the upper hierarchy data based on the quantization step width E0, E1, E2, or E3 determined in the upper hierarchy having lower resolution in every predetermined block of respective hierarchy data to quantize respective hierarchy data D44, D43, D42, and D41 respectively and for determining the uppermost hierarchy data D35 having lowermost resolution to fixed quantization step width $P_A$; and quantizing means 53A, 55A, . . . for quantizing respective hierarchy data in accordance with each quantization step width $P_A$, E0, E1, E2, E3.

According to this invention, in a picture encoding apparatus 40 for sequentially and recursively generating a plurality of hierarchy data D51 to D54 having a plurality of different resolutions from a picture data D31, the quantization step width E0, E1, E2, or E3 of a lower hierarchy data of which the resolution is higher than the upper hierarchy data, is determined in order to omit additional codes showing the characteristic of the quantizers, so that the picture encoding apparatus 40 in which the compression efficiency in hierarchy-encoding can be improved, and the deterioration of the picture quality can be reduced, can be realized.

According to this invention, when the quantization step width E1, E2, E3 of the lower hierarchy data is determined, the gain which is multiplied by the quantization step width E0, E1, E2 of the upper hierarchy data adjacent to the lower hierarchy data, is determined with reference to the historical information of the selected result of the gain in the upper hierarchy data prior to the result in the lower hierarchy data, so that the suitable quantization step width can be obtained for respective hierarchy data, and a picture encoding apparatus 60 in which the deterioration of picture quality can be reduced, can be realized.

According to this invention, in a picture encoding apparatus 70 for sequentially and recursively generating a plurality of hierarchy data D51 to D54 having a plurality of different resolutions from input picture data D31, the quantization bit number of a lower hierarchy data having a resolution higher than the upper hierarchy data is determined for each of the predetermined blocks of respective hierarchy data D44, D43, D42 D41 based on the quantization step width E0, E1, E2, E3 determined in the upper hierarchy data having a lower resolution, so that the quantization bit number can be adaptively determined by using the relation between adjacent hierarchies. Thereby, the transmitting bit number can be effectively reduced without deteriorating the picture quality, and a picture encoding apparatus 70 such that, the compression efficiency can be improved, can be realized.

According to this invention, in a picture encoding apparatus 80 for sequentially and recursively generating a plurality of hierarchy data D51 to D54 having a plurality of different resolutions from input picture data D31, when a plurality of hierarchy data is encoded, the quantization step width E1, E2, E3 of the lower hierarchy data having a resolution of which is higher than that of the upper hierarchy data is determined for each predetermined block of hierarchy data D44, D43, D42, D41, based on the quantization step width E0, E1, E2, E3 determined by the upper hierarchy data having low resolution, and the quantization step width $P_A$ in quantizing the uppermost hierarchy data D35 having a lowest resolution is generated by calculating the pixel value of pixel to be quantized contained in the block to be quantized of the uppermost hierarchy data and the pixel value of the neighboring pixel near the pixel to be quantized, so that the quantization step width in respective hierarchy data can be determined to a value which is suitable to respective hierarchy data. Therefore, the picture encoding apparatus 80, in which the deterioration of the picture quality can be reduced in quantizing, can be realized.

BRIEF DESCRIPTION OF DRAWINGS

FIG. 4 is a table diagram showing the predictive dividing result in an HD standard picture;

FIG. 5 is a table diagram showing the standard deviations of the signal levels of the respective hierarchies in the HD standard picture;

FIG. 26 is a schematic diagram explaining the initialization of the quantization step width according to other embodiments;

FIGS. 28, 29, 30(A) and 30(B) are schematic diagrams explaining the initialization of the quantization step width according to other embodiments.

BEST MODE FOR CARRYING OUT THE INVENTION

[1] First Embodiment

An embodiment of this invention will be described in detail, with the accompanying drawings.

(1) Principle of Hierarchy Encoding

Figure 1:
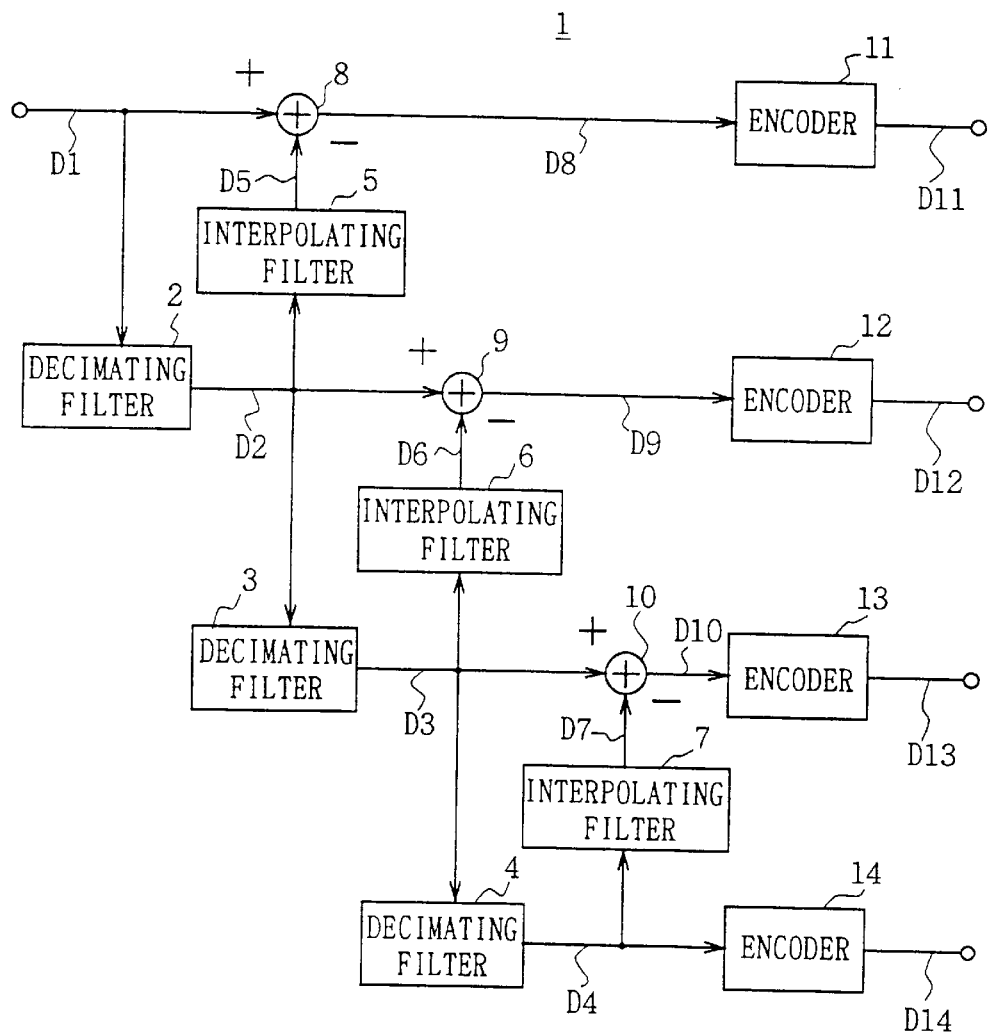
FIG. 1 is a block diagram showing a conventional picture encoding apparatus.
Figure 2:
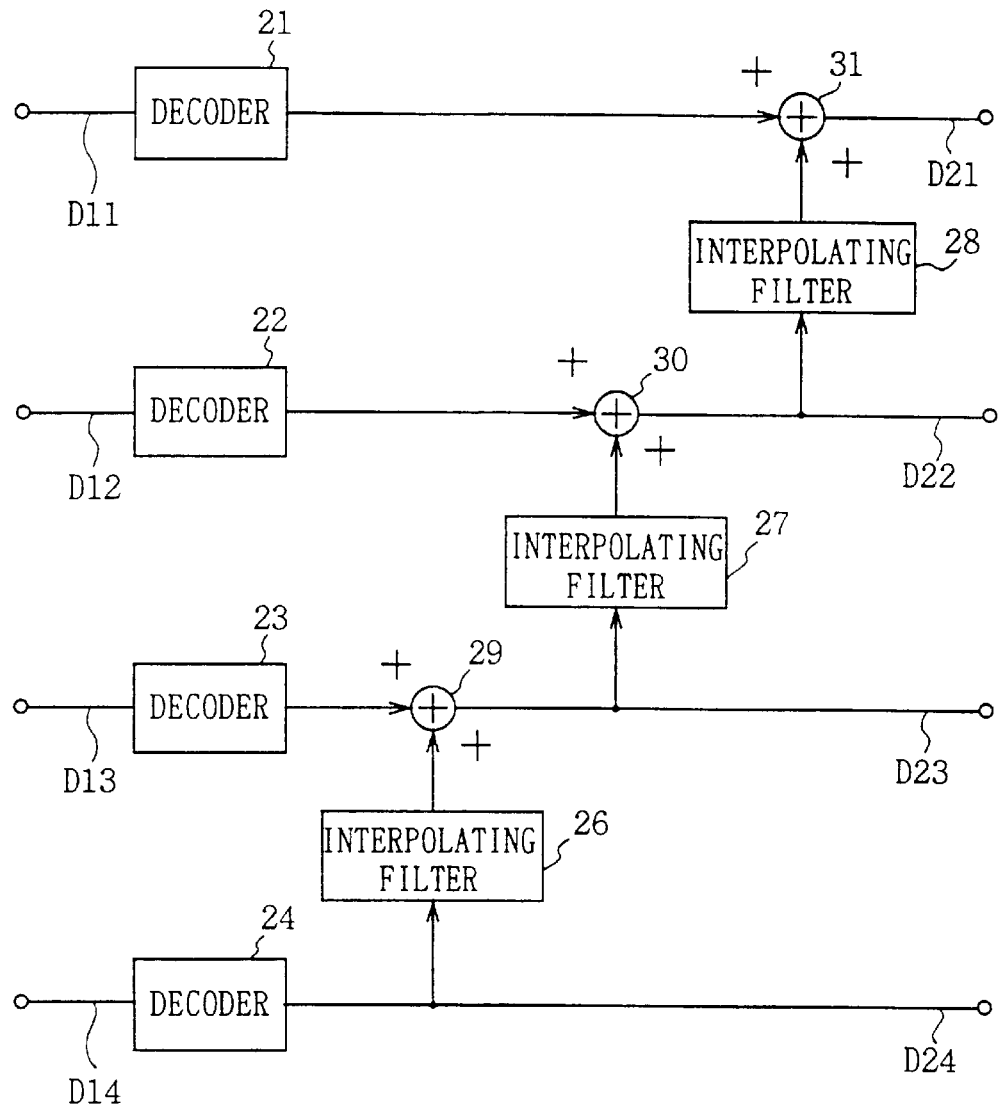
FIG. 2 is a block diagram showing a conventional picture decoding apparatus.
Figure 3:
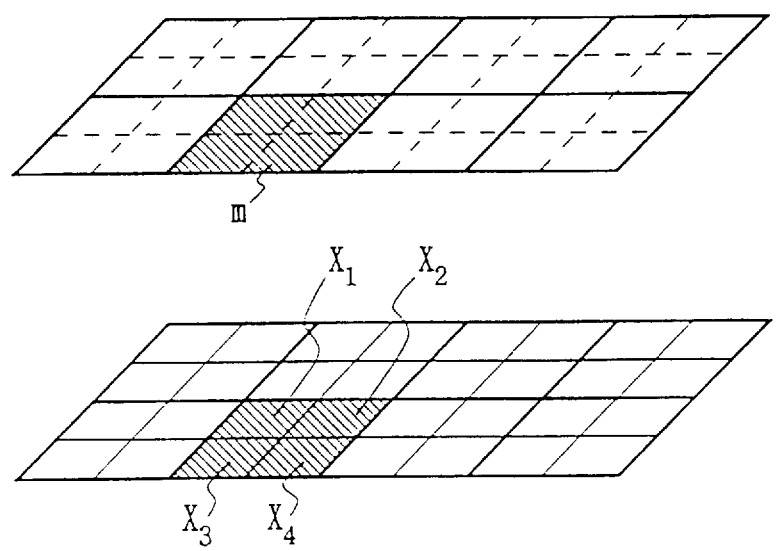
FIG. 3 is a schematic diagram explaining hierarchy data generated by the picture encoding apparatus.

As the principle of hierarchical encoding according to this invention, FIG. 3 generally denotes the principle of compression in the case where for example, a still picture of high-grade television signal, etc., is encoded hierarchically. In the hierarchical-encoding, an upper hierarchy data is formed based on the simple arithmetic mean of a lower hierarchy data, so that a hierarchical structure can be realized without increasing the information amount. Further, when decoding upper hierarchies into lower hierarchies, division is controlled predictively based on the activity of each block, so as to reduce the information amount of flat portions. Furthermore, in encoding of difference signal which is performed for lower hierarchies, the quantization characteristic is switched for each block without additional codes based on the activity of the upper hierarchies, to realize high-efficiency encoding.

That is, in the hierarchical structure of hierarchical-encoding, a high-grade television signal is set to the lower hierarchy, and for four pixels X1 to X4 in a small block of the lower hierarchy being 2 lines×2 pixels, an average of these is obtained by the following equation:

$$m=(X1+X2+X3+X4)/4 \quad (1)$$

the value "m" is set as the value of the upper hierarchy. In the lower hierarchy, the difference values of three pixels between the upper hierarchy are provided by the following equation:

$$\Delta Xi=Xi-m \text{(where } i=1 \text{ to 3)} \quad (2)$$

to form the hierarchical structure with same information amount as the former 4-pixel data.

On the other hand, when decoding the lower hierarchy, for three pixels X1 to X3, the mean value "m" of the upper hierarchy is added to each of the difference values $\Delta Xi$ to obtain the decoded values $E[Xi]$ as shown in the following equation:

$$E[Xi]=\Delta Xi+m \text{(where } i=1 \text{ to 3)} \quad (3)$$

For the remaining one pixel, the three decoded values of the lower hierarchy are subtracted from the mean value "m" of the upper hierarchy to determine the decoded value $E[X4]$ as shown in the following equation:

$$E[X4]=m\times 4-E[X1]-E[X2]-E[X3] \quad (4)$$

Here, $E[\ ]$ denotes the decoded value.

Here, in the hierarchical-encoding, when the upper hierarchy is decoded into the lower hierarchy, the resolution increases four times for each hierarchy, however, in a flat portion, the degree of redundancy is reduced by prohibiting it from dividing the hierarchy. Note that, flags of one bit which indicates the presence of the division are provided into each of the blocks. The necessity of this division in the lower hierarchy is judged with respect to, for example, the maximum value of the difference data as a local activity.

Here, as an example of hierarchical-encoding, FIG. 4 shows the predictive divided result in the case where five hierarchical-encoding is performed by using an HD standard picture (Y signal) of ITE. It shows the ratio of the number of pixels of respective hierarchies when the threshold with respect to the maximum difference data is changed, to the original number of pixels, thereby, the reduction of the redundancies corresponding to the spatial correlation can be found. The reduction efficiency varies among the pictures. When the threshold of the maximum difference data is changed in the range of 1 to 6, the average reduction ratio becomes 28 to 69 [%].

In practical use, the lower hierarchy is formed by quadrupling the resolution of the upper hierarchy, and then the difference data between the upper hierarchy data and the lower hierarchy data is encoded, so that the signal level width can be reduced effectively. FIG. 5 shows the case where five hierarchies are encoded hierarchically by the above hierarchical-encoding described with the accompanying FIG. 4. Herein, hierarchies are denoted as the first to the fifth hierarchies respectively, from the lowest hierarchy.

The signal level width can be reduced comparing with the 8-bit PCM data of an original picture. More particularly, since the first through fourth hierarchies having large numbers of pixels are difference signals, it can be reduced remarkably. As a result, the efficiency in the following quantization can be improved. As shown by the table of FIG. 5, the reduction efficiency is least dependent upon the picture, that is, the reduction efficiency can be used effectively with respect to all of the pictures.

Further, the upper hierarchy is formed in accordance with the mean value of the lower hierarchy so as to suppress error propagation, while the lower hierarchy is converted into the difference from the mean value of the upper hierarchy, so that the efficiency can be improved. Practically, in the hierarchical-encoding, since activities between hierarchies at the same spatial position have correlation, by determining the quantization characteristic of the lower hierarchy based on the quantizing result of the upper hierarchy, a predictive quantizer without adding additional codes can be realized.

Practically, the picture is hierarchical-encoded in accordance with the above hierarchical structure having five stages so as to represent it by multi-resolution, and performed predictive-dividing and predictive-quantizing by utilizing the hierarchical structure, so that various HD standard pictures (Y/P$_B$/P$_R$ of 8-bit) can be compressed into about one eighth. Further, to the additional codes of each block for predictive-dividing, run-length encoding is performed in respective hierarchies to improve the compression efficiency. Thereby, pictures with sufficient picture quality can be obtained in respective hierarchies, further, in the lowest hierarchy, a fine picture without visible deterioration can be obtained.

(2) Picture Encoding Apparatus of the First Embodiment

Figure 6:
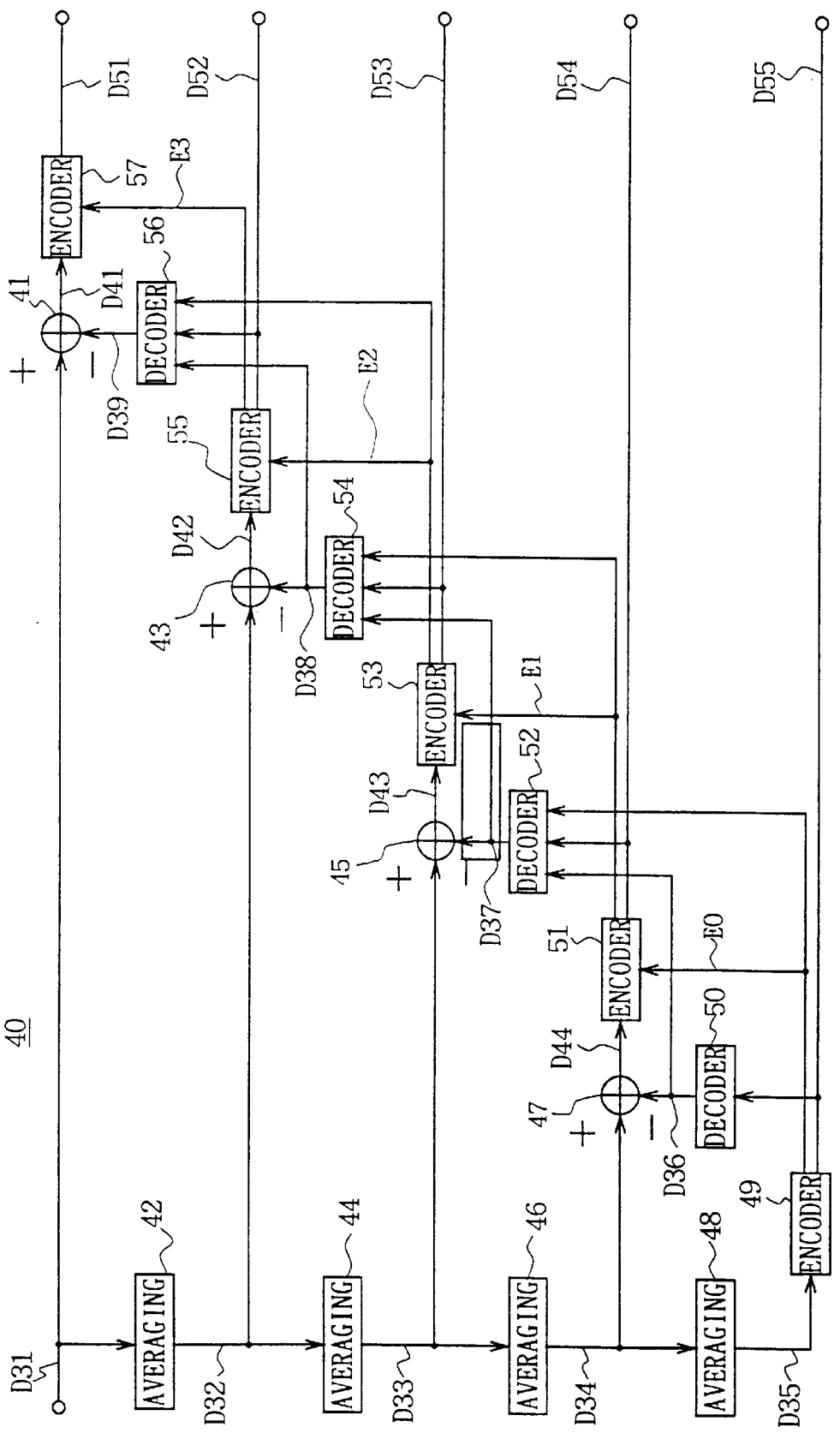
FIG. 6 is a block diagram illustrating the circuit construction of one embodiment of the picture encoding apparatus.
Figure 7:
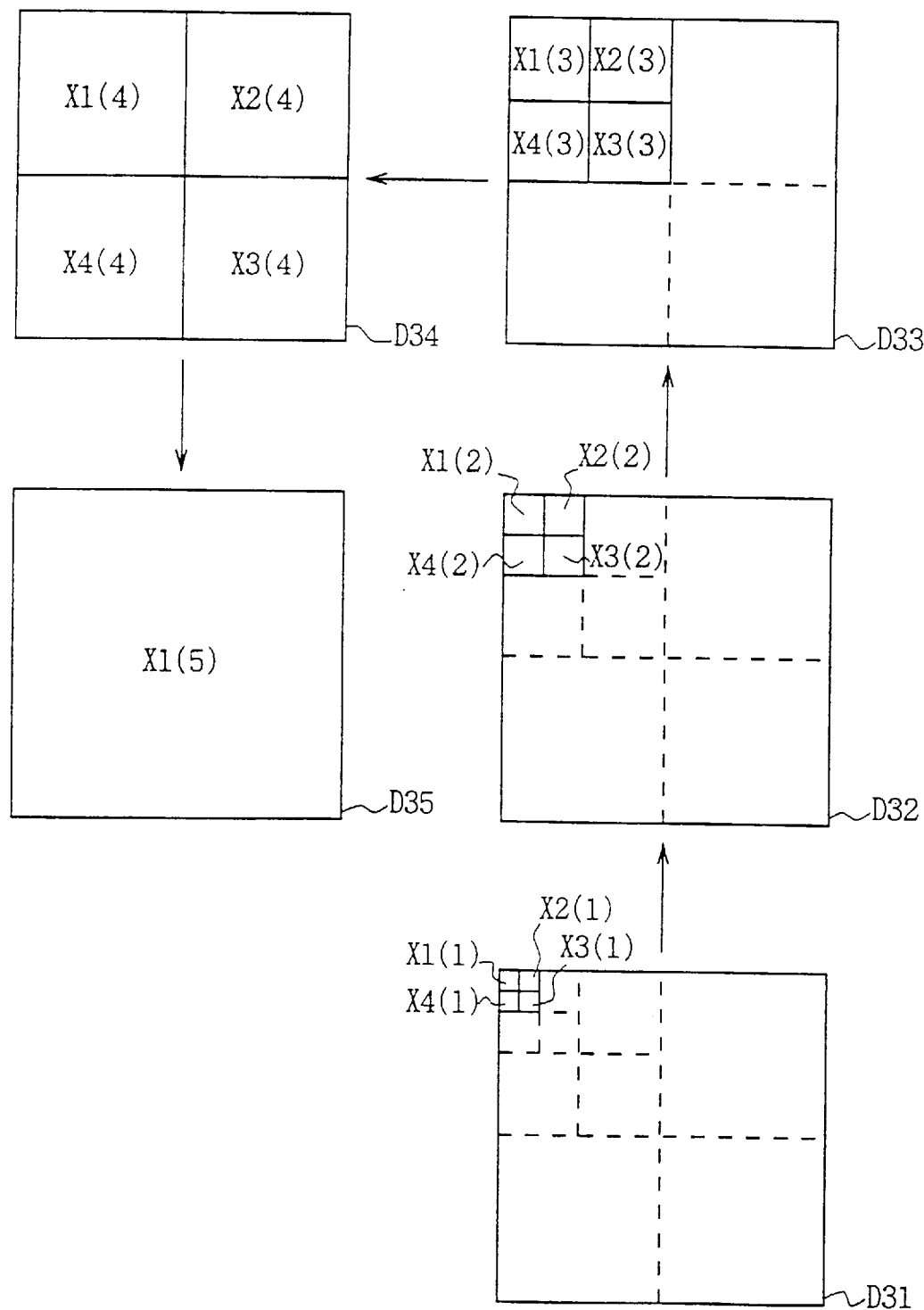
FIG. 7 is a schematic diagram explaining the generation function of the hierarchy data.

In FIG. 6, 40 generally denotes a picture encoding apparatus according to this invention. An input data D31 is input to a difference circuit 41 and an averaging circuit 42. The averaging circuit 42 generates a pixel X1(2) of the second hierarchy data D32 on the basis of the four pixels X1(11) to X4(1) of the input picture data D31 which consists of the first hierarchy data as shown in FIG. 7. Similarly, pixels X2(2) to X4(2) which are adjacent to the pixel X1(2) of the second hierarchy data D32, are generated corresponding to the average of the four pixels of the first hierarchy data D31. The second hierarchy data D32 is input to a difference circuit 43 and an averaging circuit 44. The averaging circuit 44 generates the third hierarchy data D33 corresponding to the average of the four pixels of the second hierarchy data D32. For example, in the case shown in FIG. 7, the pixel X1(3)of the third hierarchy data D33 is generated on the basis of the pixels X1(2) to X4(2) of the second hierarchy data D32, and also the pixels X2(3) to X4(3) which are adjacent to the pixel X1(3) are generated similarly corresponding to the average of the four pixels of the second hierarchy data D32.

The third hierarchy data D33 is input to a difference circuit 45 and an averaging circuit 46. The averaging circuit 46 generates the fourth hierarchy data D34 which consists of the pixels X1(4) to X4(4) as shown in FIG. 7, corresponding to the average of the four pixels of the third hierarchy data D33 same as the above. The fourth hierarchy data D34 is input to a difference circuit 47 and an averaging circuit 48. The averaging circuit 48 generates the fifth hierarchy data D35 which is the uppermost hierarchy corresponding to the average of the four pixels of the fourth hierarchy data D34. As shown in FIG. 7, the four pixels X1(4) to X4(4) of the fourth hierarchy data D34 are averaged to generate the pixel X1(5) of the fifth hierarchy data D35.

Here, when the block size of the first hierarchy data D31 which is the lowest hierarchy is 1×1, block sizes of the second hierarchy data D32 is ½×½, that of the third hierarchy data D33 is ¼×¼, that of the fourth hierarchy data D34 is ⅛×⅛, and the fifth hierarchy data D35 which is the uppermost hierarchy data is ¹⁄₁₆×¹⁄₁₆.

For example, when the upper hierarchy data is generated corresponding to the average of the four pixels of the lower hierarchy data, which are corresponding spatially, denoting the upper hierarchy data by "M" and the pixel value of the lower hierarchies by "a", "b", "c", and "d", the transmitting pixel may be four pixels.

That is, a non-transmitted pixel "d" can be restored easily at the side of decoder by the following equation using the above "M", "a", "b", "c", and "d":

$$d = 4 \times M - (a+b+c) \quad (5)$$

Figure 8:
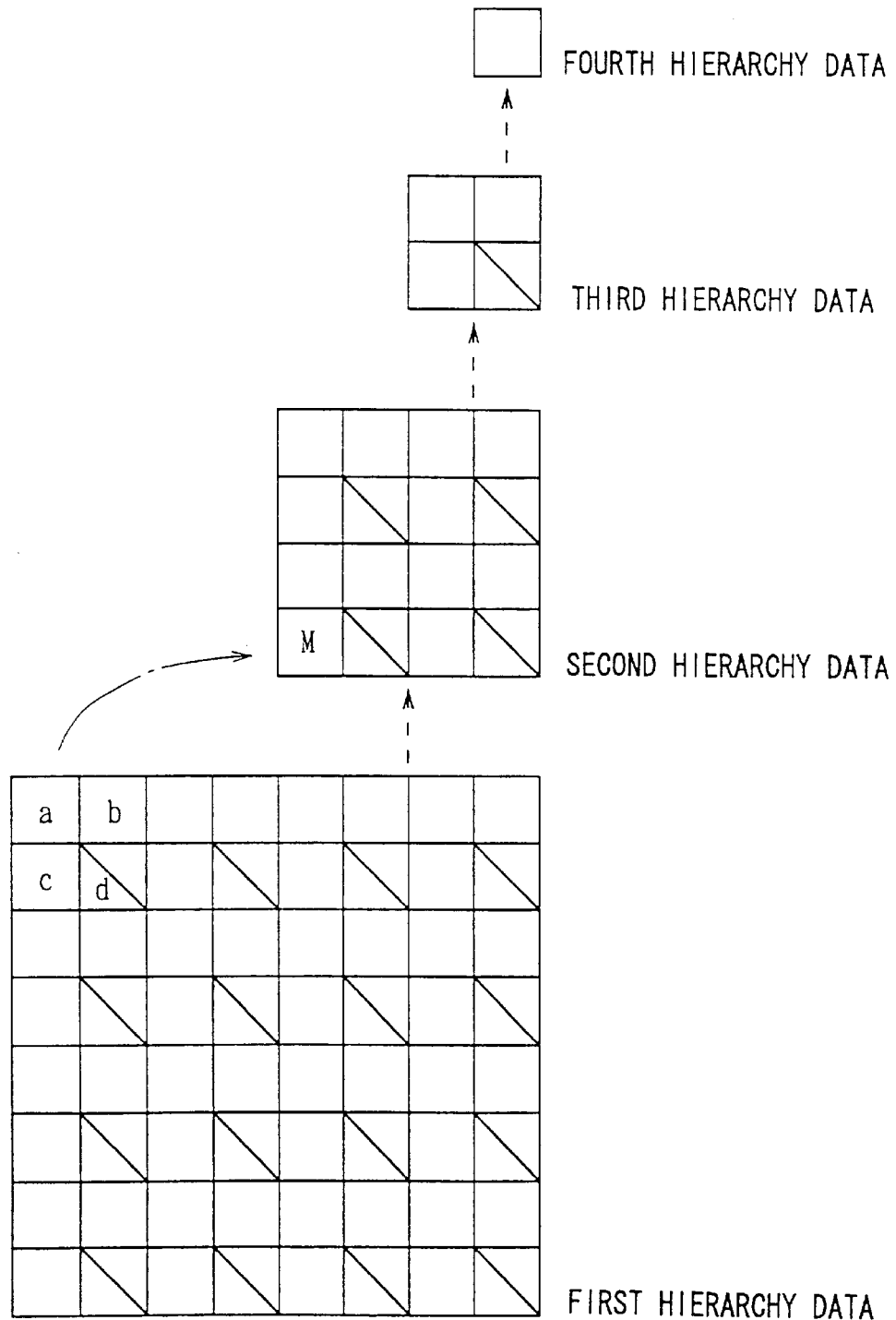
FIG. 8 is a schematic diagram explaining the hierarchical structure of the hierarchy data.

FIG. 8 shows an example of four hierarchies by the typical diagram of relation between hierarchies. Here, respective hierarchy data is generated corresponding to the average of the four pixels of the lower hierarchies, so that the all of data can be restored by the arithmetic shown by the equation (5) without transmitting the data of the oblique-lined portion of FIG. 8. As a result, in the picture encoding apparatus 40, the number of encoded pixels by the following encoder can be reduced, so that the deterioration of the compression efficiency can be avoided even if encoding upon dividing into a plurality of hierarchy pictures.

Here, in the picture encoding apparatus 40, the fifth hierarchy data D35 is compressed and encoded by an encoder 49, to generate the fifth hierarchy compression encoded data D55.

Further, in the picture encoding apparatus 40, the difference calculation between adjacent hierarchies is executed among five hierarchy data D31 to D35, in order to generate inter-hierarchy difference data D44, D43, D42, and D41.

That is, in the picture encoding apparatus 40, the fourth hierarchy data D34 is input to the difference circuit 47, as well as restored data D36 which is the fifth hierarchy compression encoded data D55 restored by a decoder 50. Thereby, the difference circuit 47 generates inter-hierarchy difference data D44 between the fourth hierarchy data D34 and the fifth hierarchy data D35, and then outputs it to an encoder 51. The encoder 51 compresses and encodes the inter-hierarchy difference data D44 in order to generate the fourth hierarchy compression encoded data D54.

Next, in the picture encoding apparatus 40, the third hierarchy data D33 and the fourth hierarchy compression encoding data D54 restored by a decoder 52, which becomes the restored data D37 same as the fourth hierarchy data D34, are input to the difference circuit 45. Thereby, the difference circuit 45 generates the inter-hierarchy difference data D43 between the third hierarchy data D33 and the restored data D37 (i.e., the fourth hierarchy data D34), and then outputs it to an encoder 53. The encoder 53 compresses and encodes the inter-hierarchy difference data D43 in order to generate the third hierarchy compression encoded data D53.

Similarly, in the picture encoding apparatus 40, the second hierarchy data D32 and the restored data D38 same as the third hierarchy data D33 which is the third hierarchy compression encoded data D53 restored by a decoder 54, are input to the difference circuit 43. Thereby, the difference circuit 43 generates the inter-hierarchy difference data D42 between the second hierarchy data D32 and the restored data D38 (i.e., the third hierarchy data D33), and then outputs it to an encoder 55. The encoder 55 compresses and encodes the inter-hierarchy difference data D42 in order to generate the second hierarchy compression encoded data D52.

Then, the picture encoding apparatus 40 inputs the first hierarchy data D31 and the restored data D39 same as the second hierarchy compression encoded data D52 restored by a decoder 56. Thereby, the difference circuit 41 generates the inter-hierarchy difference data D41 between the first hierarchy data D31 and the restored data D39 (i.e., the second hierarchy data D32), and then outputs it to an encoder 57. The encoder 57 compresses and encodes the inter-hierarchy difference data D41 in order to generate the first hierarchy compression encoded data D51.

In this manner, in the picture encoding apparatus 40, the fifth hierarchy compression encoded data D55, the fourth hierarchy compression encoded data D54, the third hierarchy compression encoded data D53, the second hierarchy compression encoded data D52, and the first hierarchy compression encoded data D51 are sequentially generated in the sequence of the above.

Here, each decoder 52, 54, or 56 receives the compression encoded data D54, D53, or D52 to be decoded from the corresponding encoder 51, 53, or 55, and at the same time, receives the quantization information E0, E1, or E2 used in the corresponding encoder 51, 53, or 55, so as to decode the compression encoded data D54, D53, or D52. Further, each decoder 52, 54, or 56 receives the restored data D36, D37, or D38 from the decoder 50, 52, or 56 of the immediately lower hierarchy, so as to generate the hierarchy data D34, D33, or D32 before obtaining difference.

Figure 9:
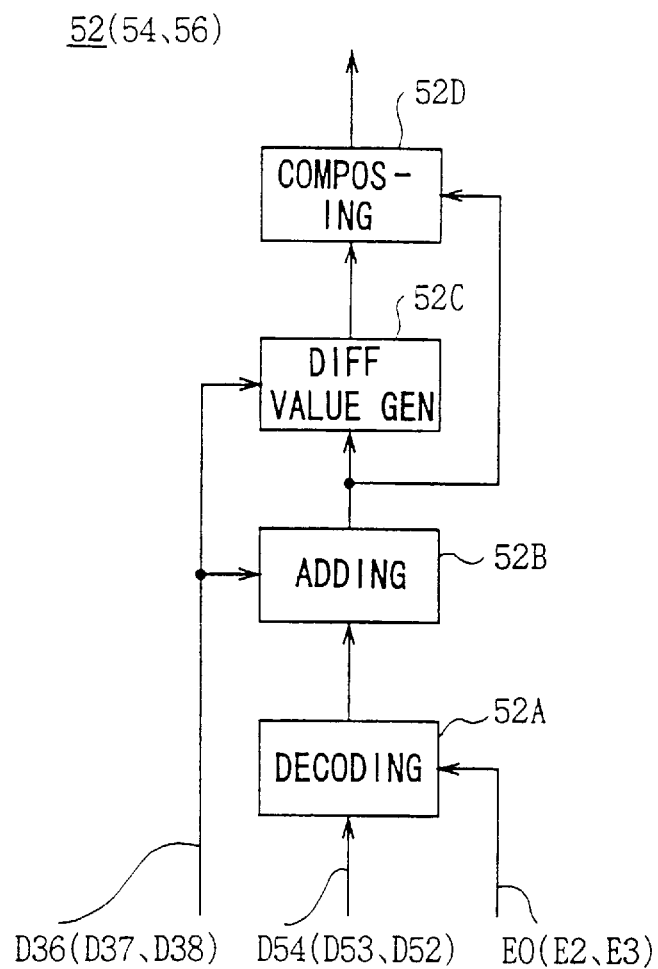
FIG. 9 is a block diagram showing the construction of a decoder according to embodiment.

Practically, each decoder 52, 54, or 56 is constructed as shown in FIG. 9. To simplify, the decoder 52 is described hereinafter. The decoder 52 receives the fourth hierarchy compression encoded data D54 and the quantization information E0 used in the generation of the fourth hierarchy compression encoded data D54 at the decoding circuit 52A to decode the fourth hierarchy compression encoded data D54. As a result, the output value, for example, X1(4)–X1(5), X2(4)–X1(5), and X3(4)–X1(5) shown in FIG. 7, are obtained from the decoding circuit 52A. The output value is added to the restored data D36 in the successive adding circuit 52B, so that the output value of X1(4), X2(4), and X3(4). The difference value generating circuit 52C performs the operation based on the equation (5), using X1(4), X2(4), X3(4), and X1(5), so as to generate non-transmit pixel X4(4). Therefore, the fourth hierarchy data X1(4), X2(4), X3(4), and X4(4) are generated at the successive composition circuit 52D and are supplied to the difference circuit 45.

The encoders 51, 53, 55, and 57 receive the quantization information E0, E1, E2, and E3 outputted from the adjacent encoders 49, 51, 53, and 55 of the upper hierarchies to encode them based on the quantization information E0, E1, E2, and E3, and determine the quantization characteristics of lower hierarchy.

(3) Selection of Quantizing Step Width

The encoders 49, 51, 53, 55, and 57 are provided a quantizer to each.

In the picture encoding apparatus 40, when the lower hierarchy data area corresponding to the upper hierarchy data area is defined as a "block", the change of the data characteristic in the block is grasped by the activity of the difference data between hierarchies D41 to D44 in the block, so that the characteristic of the quantizer is determined based on the data characteristic.

In the embodiment, 2-bit quantizers are used as the quantizer. FIG. 9 shows the quantization characteristic in the case that in the quantizer, the inter-hierarchy difference data in which the difference value is in the range of +128 to −128, is 2-bit quantized. The difference value is quantized to "0" through "3". Further, in the embodiment, in the respective hierarchy data, since the upper hierarchy data is generated corresponding to the average of four pixels of 2×2, the four pixels are existent in the lower hierarchy of each of blocks.

Here, as a method of determining the quantization characteristic of each quantizer, first, the difference data between hierarchies is 2-bit quantized by the quantization step width which has been determined in the upper hierarchy, so that any one of the quantized value, 0, 1, 2 or 3 shown in FIG. 9 is generated.

Here, since the distribution of the quantized value of four pixels in a block indicates the activity in the block, the quantization step width of the next hierarchy is determined based on the distribution of the quantized value of the four pixels. In this manner, since the quantization step width is selected based on the intra-block quantized value distribution, additional codes showing the kind of quantizers become unnecessary.

As a result, in the picture encoding apparatus 40, compression efficiency by the encoders 51, 53, 55, and 57 can be improved, and the deterioration of picture quality in the compression encoding processing can be avoided.

Figure 11:
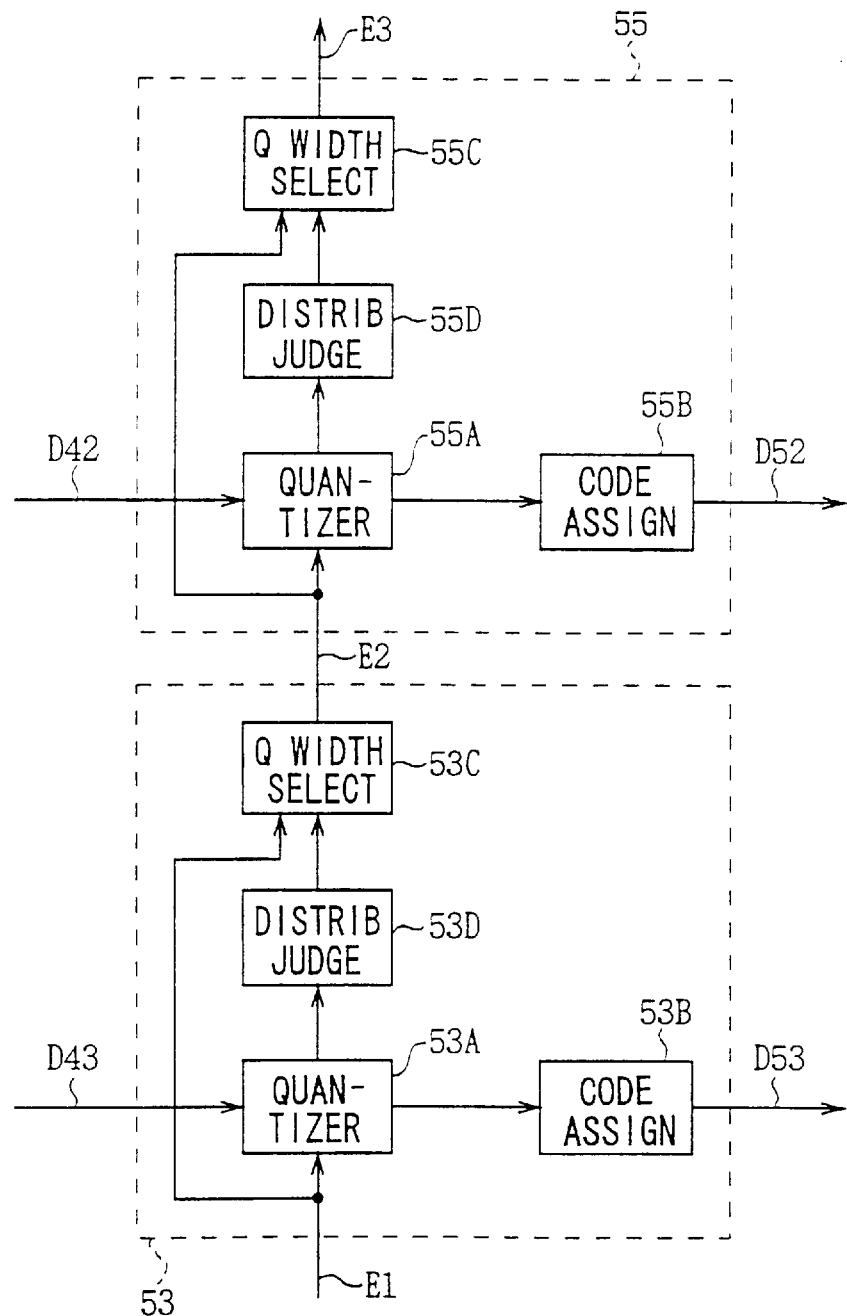
FIG. 11 is a block diagram showing the construction of the encoder of FIG. 6.

Practically, the encoders 51, 53, 55, and 57 are constructed as shown in FIG. 11. To simplify, the encoders 53 and 55 are described hereinafter.

The inter-hierarchy difference data D43 output to the encoder 53 is input to the quantizer 53A, and the quantizer 53A quantizes the inter-hierarchy difference data D43 based on the quantization information E1 received from the encoder 51 of the upper hierarchy. Note that the quantization information E1 is the quantization step width.

An optimum code word such that the amount of information is reduced is assigned to the quantized value obtained as a result by a code word assigning circuit 55B, and the value is output as a compression encoded data D53.

Further, the quantized value is supplied to a distribution judging circuit 53D. The distribution judging circuit 53D judges the distribution of the quantized value, and supplies the judged result to a quantization width selecting circuit 53C. The quantization width selecting circuit 53C receives the distribution judged result and the quantization information E1, and selects the new quantization step width on the basis of the distribution judged result to output it to an adjacent encoder 55 of lower hierarchy as a quantization information E2.

Similarly, the encoder 55 receives at the quantizer 55A the quantization information (quantization step width) E2 generated in the encoder 53, and quantizes the inter-hierarchy difference data D42 by using the quantization step width which is generated by the quantizer 55A at the upper hierarchy. A compression encoded data D52 is obtained via the successive code word assigning circuit 55B based on the obtained quantized value, and judges the distribution condition of quantized value by the distribution judging circuit 55D. The quantization width selecting circuit 55C receives the distribution judged result and the quantization information E2, selects the new quantization step width based on the distribution judged result, and outputs it to the adjacent encoder 57 of lower hierarchy as a quantization information E3.

Figure 10:
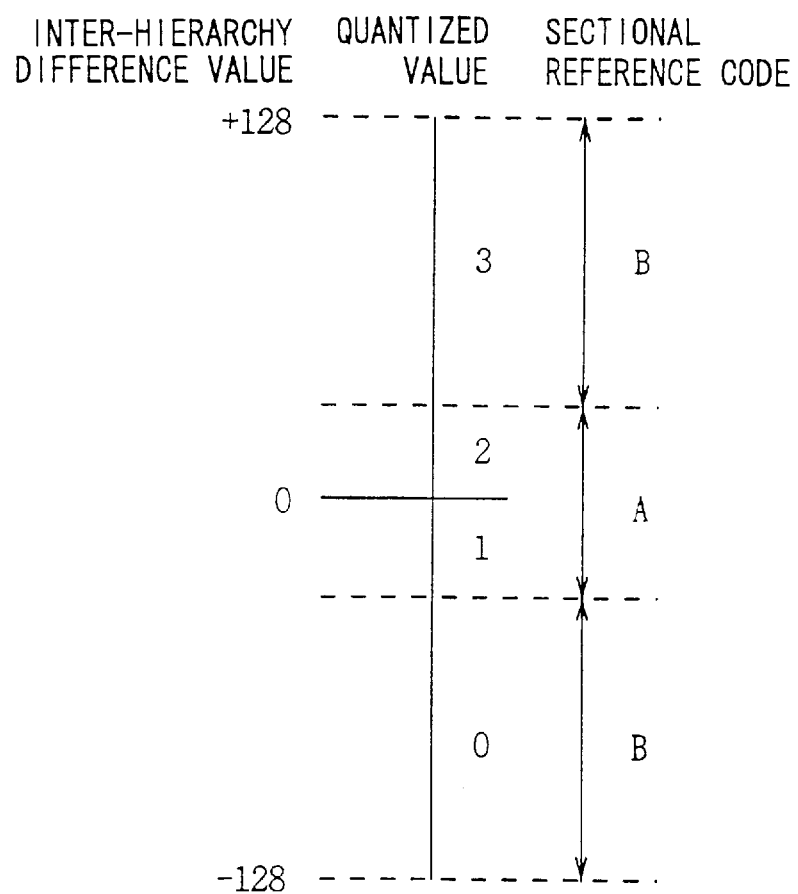
FIG. 10 is a schematic diagram showing the characteristic of a quantizer according to embodiment.

Next, the defined rule of the quantization step width according to the distribution judging circuits 53D, 55D . . . . and the quantization width selecting circuit 53C, 55C, . . . will be described below. As shown in FIG. 10, the distribution judging circuits 53D and 55D divide each of the quantized values "0" to "3" into classes of sections A and B. That is, when the quantized value is "1" or "2", it is classified to the section A, and when the quantized value is "0" or "3", it is classified to the section B.

Here, as a characteristic of a quantizer in the case where an image of high quality is formed efficiently, in the block having a higher activity, a rough quantizer having a large quantization step width is used. On the other hand, in the block having a lower activity, a quantizer having a narrow quantization step width is used. Considering that, the following rules are set.

That is, denoting the quantization step width of the upper hierarchy by p0, and the quantization step width of the lower hierarchy by p1, the quantization width selecting circuits 53C and 55C determine the quantization step width of the lower hierarchy p1 in accordance with the following rules:

Rule 1) When all of the quantized values of four pixels belong to the section B, p1=2×p0

Rule 2) When the quantized values of four pixels belong to the sections A and B, p1=p0

Rule 3) When all of the quantized values of four pixels belong to the section A, p1=p0/2

Here, the rule 1) corresponds to the case where the activity in the block is large, in this case, the quantization step width of the next lower hierarchy is enlarged so as to suppress the quantization distortion.

Further, the rule 2) is considered in the various cases in the state of the activity in the block, however, it is generally considered that the absolute value of data of the section B is not so large on the basis of the spatial correlation, thereby, the quantization step width of the upper hierarchy is kept.

Furthermore, the rule 3) corresponds to the case where the activity in the block is small. In this case, the quantization step width of the next lower hierarchy is reduced, so as to suppress the deterioration of image quality in the flat part.

In such a manner, in the picture encoding apparatus 40, the quantization width of the lower hierarchy is determined corresponding to the activity in the block of the upper hierarchy.

(4) Operation of the First Embodiment

Figure 12:
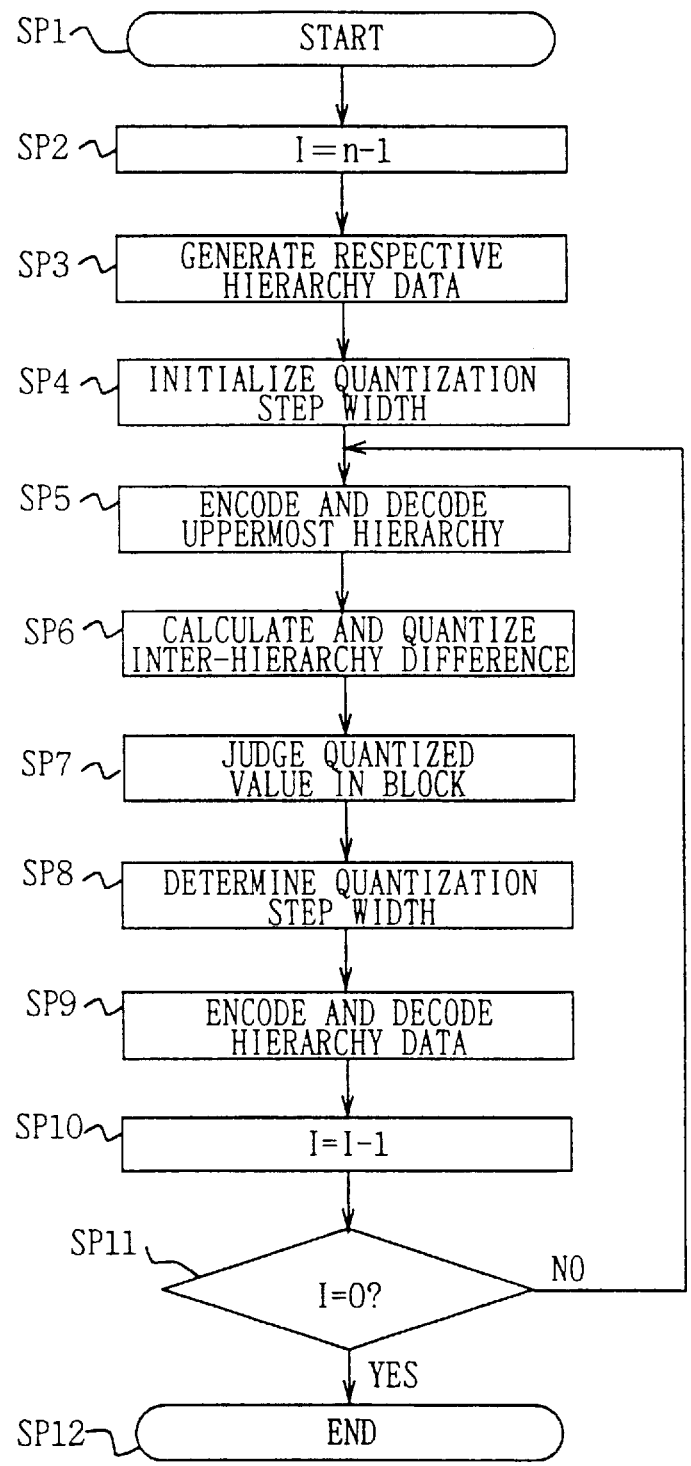
FIG. 12 is a flowchart explaining the operation of the hierarchical encoding according to first embodiment.

According to above configuration, the picture encoding apparatus 40 sequentially generates the first to the n-th hierarchy compression encoded data in accordance with the processing procedure such as shown in FIG. 12 (in the embodiment, n=5).

That is, the picture encoding apparatus 40 enters the processing from the step SP1, and at the succeeding step SP2, the picture encoding apparatus 40 images the n-th hierarchy so as to input "n−1" to the hierarchy counter I.

At the succeeding step SP3, the picture encoding apparatus 40 generates hierarchy data D31 to D35 for n-hierarchies by averaging circuits 42, 44, 46, and 48, and proceeds to the step SP4 to set the initial value of the quantization step width belonging to the uppermost hierarchy.

At the succeeding step SP5, the picture encoding apparatus 40 executes the encoding and decoding processing of the uppermost hierarchy data D35. In this connection, at this time, the picture encoding apparatus 40 does not quantize the uppermost hierarchy data D35 by the initial value of the quantization step width which is initialized in the step SP4, but by the initial value of the quantization step width is set as an initial value to determine the quantization step width in the lower hierarchy.

Next, the picture encoding apparatus 40 proceeds to step SP6 to perform difference calculation between hierarchies by the difference circuits 47, 45, 43, and 41, in order to quantize for thus generated inter-hierarchy difference data D44, D43, D42, and D41 by the quantization step width of the upper hierarchy.

At step SP7, the picture encoding apparatus 40 executes the judgment in accordance with the above rules 1) to 3) based on the distribution of the quantized value in the block. Then, at the succeeding step SP8, the picture encoding apparatus 40 determines the quantization step width of the lower hierarchy based on the judged result, and transmits it to the lower hierarchy.

At the succeeding step SP9, the picture encoding apparatus 40 encodes and decodes the inter-hierarchy difference data D44, D43, D42, and D41 by using the quantization step width determined in the step SP8.

At the step SP10, the picture encoding apparatus 40 decrements the hierarchy counter I, and at the succeeding step SP11, judges whether or not the hierarchy counter I is "0".

When an affirmative result is obtained, it means that the processing of all hierarchies has been completed, thus, the picture encoding apparatus 40 proceeds to step SP12 to terminate the processing. On the other hand, at the step SP11, if a negative result is obtained, the picture encoding apparatus 40 returns to the step SP5 to repeat the above processing of steps SP5 to SP10 for the hierarchy which is lower by one.

(5) Effects of the First Embodiment

According to the above configuration, the quantization step width p1 of the lower hierarchy is determined based on the distribution of the quantized values of the upper hierarchy, so that additional codes showing the characteristic of the quantizer can be omitted, and the picture encoding apparatus 40 of which the compression efficiency is improved and the deterioration of the picture quality is reduced, can be realized.

(6) Other Embodiments in the First Embodiment

Figure 13:
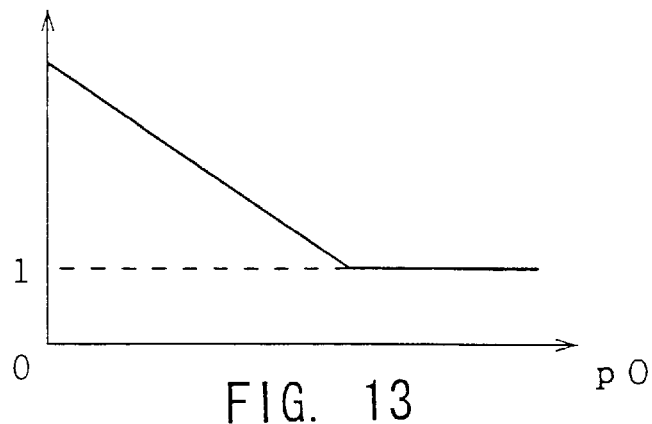
FIG. 13 is a characteristic curved diagram illustrating the characteristic of liner weight according to other embodiments.

Note that, in the embodiments described above, it has been described the case where the quantization step width p1 of the lower hierarchy is determined by multiplying by 2, 1, or ½ to the quantization step width p0 of the upper hierarchy in accordance with the rules 1) to 3). However, this invention is not only limited to this, but the quantization width p0 of the upper hierarchy may be multiplied by the linear weight w1 shown in FIG. 13. Furthermore, various weights as the weight for the quantization step width of the upper hierarchy may be applied.

For example, it may multiply a non-linear weight to the quantization step width p0 of the upper hierarchy to determine the quantization step width p1 of the lower hierarchy. In this case, denoting the quantization step width of the upper hierarchy by p0, the quantization step width of the lower hierarchy by p1, and the non-linear weights by w2(p0) and w3(p0), it may use the following rules for non-linear weighing the quantized value:

Rule 1) When all of the quantized values of four pixels belong to the section B of FIG. 10, p1=w2(p0)×p0

Rule 2) When the quantized values of four pixels belong to the sections A and B of FIG. 10, p1=p0

Rule 3) When all of the quantized value belong to the section B of FIG. 10, p1=w3(p0)×p0

Figure 14:
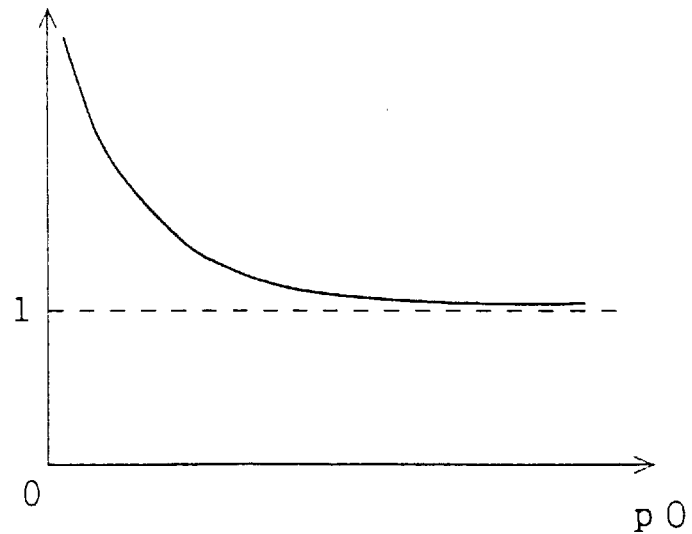
FIGS. 14(A) and 14(B) are characteristic curved diagrams illustrating the characteristic of non-liner weight according to other embodiments.
Figure 14:
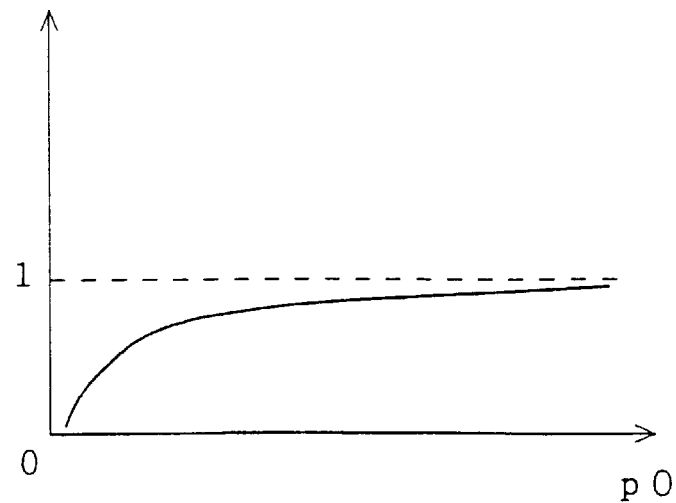

As the characteristics of the non-linear weights w2(p0) and w3(p0), as shown in FIGS. 14(A) and 14(B), the weights converge into "1" as the value of the upper hierarchy quantization step width p0 increases, so that the quantization characteristic in the processing in a plurality of hierarchies can be stabilized.

Further, when the linear weight is multiplied by the quantization step width of the upper hierarchy, if the weight w1(p0) is converged into "1" as the value of the upper hierarchy quantization step width p0 becomes large, as same as the case of the non-linear weight described above, the quantization characteristic in the processing among a plurality of hierarchies can be stabilized.

As the above, a method that obtains the quantization step width of a lower hierarchy by multiplying the quantization step width of an upper hierarchy by the predetermined weight, can be represented as follows.

Denoting a parameter indicating the distribution of the quantized value of four pixels in a block by ptn (here, the parameter ptn is a pixel number belonging to, for example, the section B in the quantized values of four pixels, etc.), and denoting a weighting function for multiplying by the quantization step width by w(·), the quantization step width p1 of the lower hierarchy is determined by using the quantization step width p0 of the upper hierarchy by the following equation:

$$p1 = w(p0, ptn) \times p0 \qquad (6)$$

That is to say, the picture encoding apparatus 40 determines a weight for multiplying by the quantization step width p0 of the upper hierarchy, based on the quantization step width p0 of the upper hierarchy and the distribution parameter ptn of the quantized values in the block.

Further, as a method for obtaining the quantization step width of lower hierarchy based on the quantization step width of upper hierarchy, in addition to the multiplying a weight, the quantization step width p1 of lower hierarchy can be directly generated from the output of the function "f" for the quantization step width p0 of upper hierarchy. In this case, the quantization step width p1 of lower hierarchy can be represented by p1=f (p0, quantized value of four pixels).

[2] Second Embodiment (1) Picture Encoding Apparatus

Figure 15:
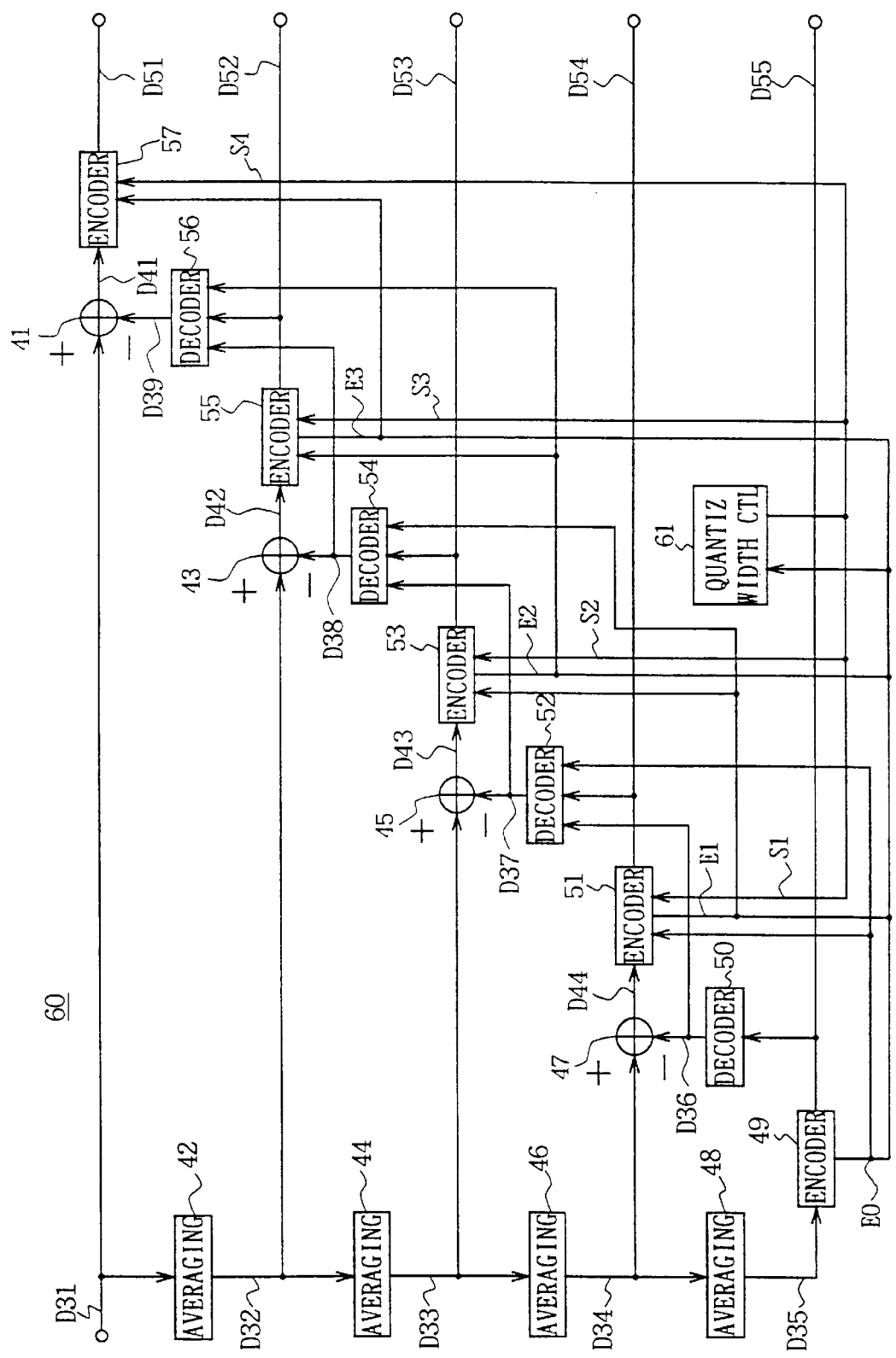
FIG. 15 is a block diagram showing the second embodiment of the picture encoding apparatus.

FIG. 15, in which the portions corresponding to those in FIG. 6 are designated with the same symbols, shows the second embodiment. A picture encoding apparatus 60 also supplies the quantized information E0, E1, E2, E3 to be output to the adjacent lower hierarchy, from respective encoders 49, 51, 53, 55 to a quantization width control circuit 61. The quantization width control circuit 61 supplies historical information signals S1, S2, S3, S4 representing the past historical information of quantization step width selection in the upper hierarchy to the respective encoders 51, 53, 55, 57, based on the quantization information E0 to E3.

Figure 16:
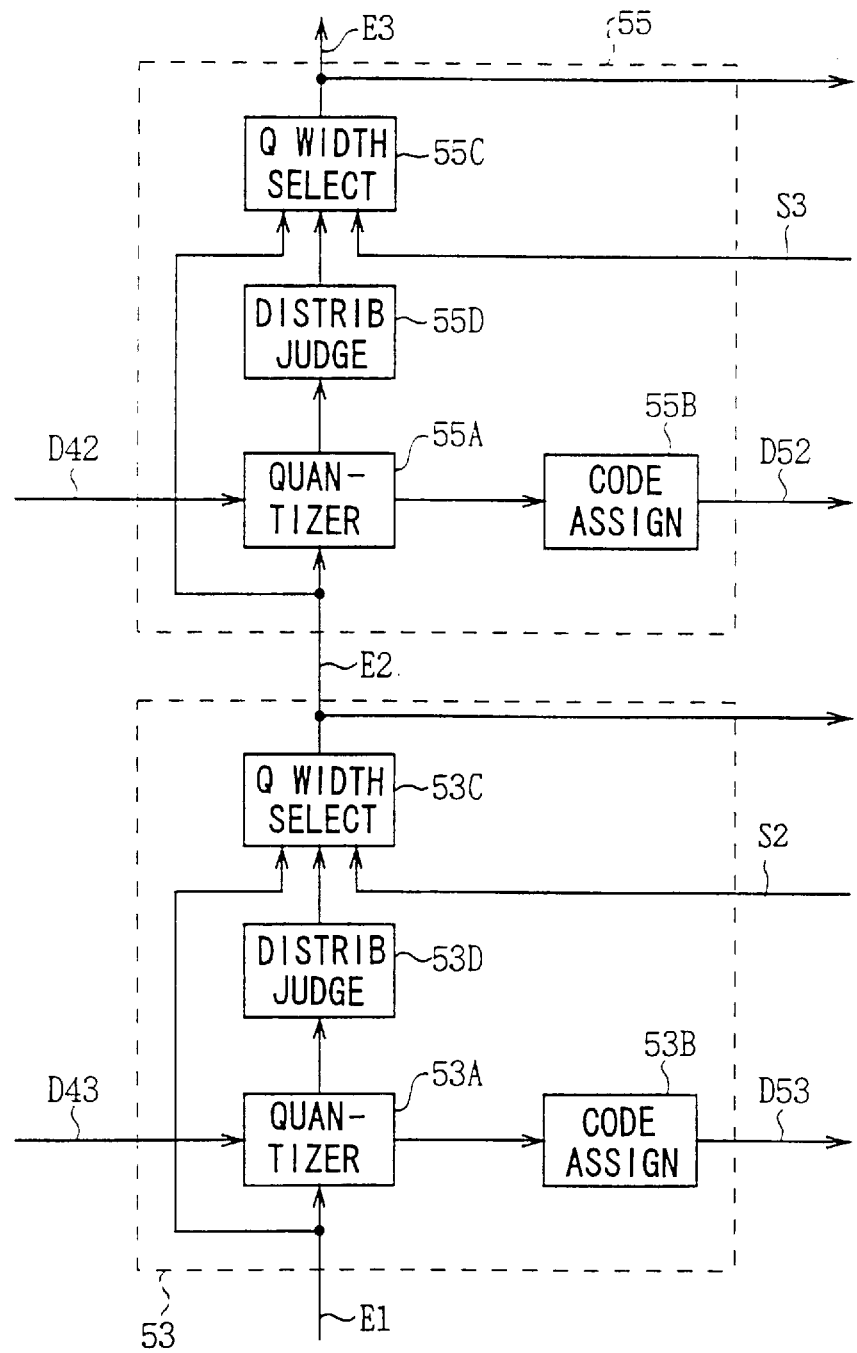
FIG. 16 is a block diagram showing the encoder of FIG. 15.

The encoders 51, 53, 55, 57 of this embodiment are constructed as shown in FIG. 16. To simplify, the encoders 53 and 55 are described with reference to FIG. 16.

The inter-hierarchy difference data D43 output to the encoder 53 is input to the quantizer 53A, the quantizer 53A quantizes the inter-hierarchy difference data D43 based on the quantization information (quantization step width) E1 received from the encoder 51 of upper hierarchy. The resultant quantized value is supplied to the code word assigning circuit 53B and the distribution judging circuit 53D. The distribution condition of the value is judged by the distribution judging circuit 53D, and the judged result is supplied to the quantization width selection circuit 53C.

By multiplying gain based on the judged result from the distribution judging circuit 53D and historical information signal S2 to the quantization information (quantization step width) E1, the quantization width selection circuit 53C generates new quantization step width, and outputs it to the adjacent encoder 53 of lower hierarchy and the quantization width control circuit 61 as a quantization information E2.

Similarly, the encoder 55 quantizes the inter-hierarchy difference data D42 based on the quantization information (quantization step width)E2 received from the encoder 53. The distribution condition of the resultant quantized value is judged by the distribution judging circuit 55D, and the judged result is supplied to the quantization width selection circuit 55C. By multiplying gain based on the judged result from the distribution judging circuit 55D and historical information signal S3 to the quantization information (quantization step width) E2, the quantization width selection circuit 55C generates new quantization step width, and outputs it to the adjacent encoder 57 of lower hierarchy and the quantization width control circuit 61 as a quantization information E3.

As a result, in the picture encoding apparatus 60, the compression efficiency by the encoders 51, 53, 55, 57 can be further improved and the deterioration of picture quality in compression encoding processing can be remarkably reduced.

Next, the defined rule of the quantization step width in the second embodiment will be described below. First, as shown in FIG. 10, each of the quantized values "0" to "3" are divided into classes of sections A and B. That is, when the quantized is "1" or "2", it is classified to the section A, and when the quantized value is "0" or "3", it is classified to the section B.

Here, as a characteristic of a quantizer in the case where an image of high quality is formed efficiently, in the block having a higher activity, a rough quantizer having a large quantization step width is used. On the other hand, in the block having a lower activity, a quantizer having a narrow quantization step width is used. Considering that, the following rules are set.

That is, denoting the quantization step width of the upper hierarchy by p0, and the quantization step width of the lower hierarchy by p1, the quantization step width of the lower hierarchy p1 is determined in accordance with the following rules:

Rule 1) When all of the quantized values of four pixels belong to the section B, p1=2×p0

Rule 2) When the quantized values of four pixels belong to the sections A and B, p1=p0

Rule 3) When all of the quantized values of four pixels belong to the section A, p1=p0/2

Here, the rule 1) corresponds to the case where the activity in the block is large, in this case, the quantization step width of the next lower hierarchy is enlarged so as to suppress the quantization distortion.

Further, rule 2) is considered in the various cases in the state of the activity in the bloc, however, it is generally considered that the absolute value of data of the section B is not so large on the basis of the spatial correlation, thereby, the quantization step width of the upper hierarchy is kept.

Furthermore, the rule 3) corresponds to the case where the activity in the block is small. In this case the quantization step width of the next lower hierarchy is reduced, so as to suppress the deterioration of picture quality in the flat part.

In such a manner, in the picture encoding apparatus 40, the quantization width of the lower hierarchy is determined corresponding to the activity in the block of the upper hierarchy.

(2) Selection of Quantization Step Width in accordance with the History

In the picture encoding apparatus 60, adding to that the quantization step width is determined in accordance with the rules 1 to 3 as described above, a record of the determined result of the quantization step width in the upper hierarchy, i.e., the selected historical information of the quantization step width in the upper hierarchy is reflected to the hierarchy being determined object of the present quantization step width prior to the result in the hierarchy of the determined object.

The above rules 1 to 3 is represented by p1=G×p0 when using the gain G, and which determines the gain G corresponding to the combination of quantized values of four pixels.

Here, in the quantizer of the embodiment, by determining in accordance with the determined historical information of the upper hierarchy being higher than the hierarchy of the determined object, and the rules 1 to 3, the gain G which is more adopted to the activity is determined, and the quantization step width is determined on the basis of the gain G.

That is to say, the determined historical information of the quantization step width in the upper hierarchy is the historical information of the selected result of the gain G.

To explain, quantized value patterns in a block are classified as follows:

Pattern 1) the case where all of the quantized values of four pixels belong to the section B Pattern 2) the case where the quantized values of four pixels belong to the section A or B Pattern 3) the case where all of the quantized values of four pixels belong to the section A Further, the frequencies of respective patterns in the determined historical information of the hierarchy which is higher than the hierarchy of the determined object of the quantized value, are defined as follows:

N1) the frequency of the pattern 1 in the upper hierarchy determined historical information N2) the frequency of the pattern 2 in the upper hierarchy determined historical information N3) the frequency of the pattern 3 in the upper hierarchy determined historical information In the quantization width selection circuits 53C, 55C, . . ., the above rule 1 is further classified into the following rules 1-1 to 1-4 by using the patterns 1 to 3 and N1 to N3, and the quantization step width is determined on the basis of the gain G obtained by the rules 1-1 to 1-4.

Rule 1-1) when being the pattern 1 and N3=0, G=2

Rule 1-2) when being the pattern 1 and N1=0, G=1.5

Rule 1-3) when being the pattern 1, and N1>TH0 and N3>TH1, G=1.0. Here, TH0 and TH1 are threshold values of the pattern generation frequency, and which are determined corresponding to the hierarchy number (the first to fifth hierarchy).

Rule 1-4) when being the pattern 1 and the upper hierarchy determined historical information is other than the above, G=2.0

The reason when the rule 1 is further classified into the rules 1-1 to 1-4, is the rule 1 gives the larger gain (G=2) for the quantization step width in the upper hierarchy, and it is afraid that in determination among plural hierarchies, since the gain G oscillates, the quantization step width oscillates.

That is, as the rules 1 to 3, if the current quantization step width is determined in accordance with only its activity of the upper hierarchy just prior to the hierarchy of the determined object of the quantization step width, the gains G=2 and gain G=½ are mixedly generated, and at this time, the gain G oscillates, as a result, the adaptive quantization step width can not be selected.

In the picture encoding apparatus 60 of the embodiment, to previously avoid the deterioration of picture quality due to oscillation of the gain G, by considering the selected historical information of the gain G in the upper hierarchy based on the rules 1-1 to 1-4, the gains G are converged corresponding to the characteristic of the hierarchy picture.

That is, the rule 1-1 is the case where the higher activity of the block is found in the selected historical information, and it means that the quantizer of this hierarchy gives lager gain (G=0) to determine the quantization step width.

Further, the rule 1-2 is the case where in the selected historical information, the block activity is not so high, and it means that the quantizer lowers the gain G gradually.

Further, the rule 1-3 is the case where in the selected historical information, both the larger gain G and the smaller gain G are generated, and at this time, it is afraid that the gain G oscillates, thus, the quantizer holds the present value of the gain G.

Furthermore, the rule 1-4 which means that it executes the general processing of the pattern 1.

In the picture encoding apparatus 60, the gain G of the quantization step width is determined in accordance with the rules 1-1 to 1-4, 2, and 3, and thus determined gain G is multiplied by the quantization step width of the adjacent upper hierarchy to determine the quantization step width of the current hierarchy, so that the oscillation of the quantization step width due to the gain G can be avoided previously. Thereby, the deterioration of picture quality can be more reduced in quantization.

(3) Operation of the Second Embodiment

Figure 17:
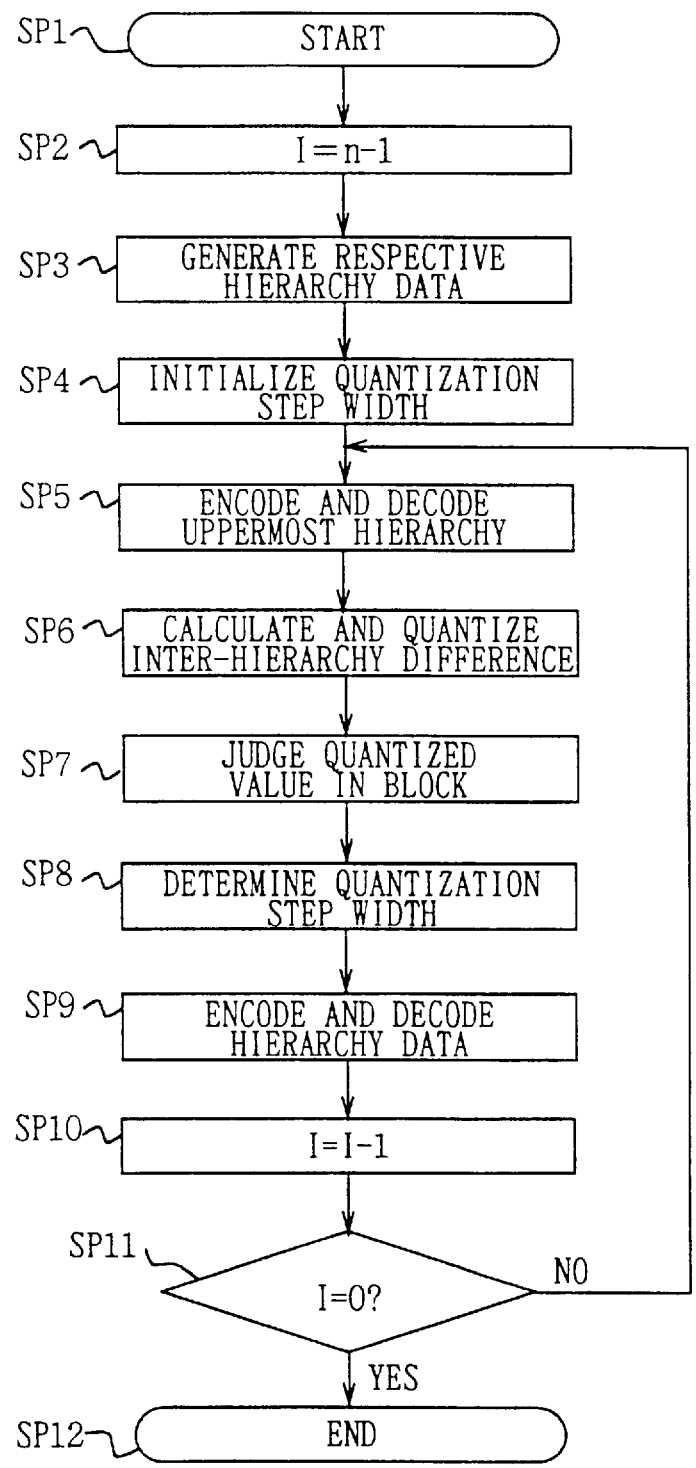
FIG. 17 is a flowchart explaining the function of the hierarchical encoding according to the second embodiment.

According to the above configuration, the picture encoding apparatus 60 sequentially generates the first to the n-th hierarchy compression encoded data in accordance with the processing procedure such as shown in FIG. 17 (in the embodiment, n=5).

That is, the picture encoding apparatus 60 enters the processing from the step SP1, and at the succeeding step SP2, the picture encoding apparatus 60 images the n-th hierarchy so as to input "n−1" to the hierarchy counter I.

At the succeeding step SP3, the picture encoding apparatus 60 generates hierarchy data D31 to D35 for n-hierarchies by averaging circuits 42, 44, 46, and 48, and proceeds to the step SP4 to set the initial value of the quantization step width belonging to the uppermost hierarchy.

At the succeeding step SP5, the picture encoding apparatus 60 executes the encoding and decoding processing of the uppermost hierarchy data D35. In this connection, at this time, the picture encoding apparatus 60 does not quantize the uppermost hierarchy data D35 by the initial value of the quantization step width which is initialized in the step SP4, but by the initial value of the quantization step width is set as an initial value to determine the quantization step width in the lower hierarchy.

Next, the picture encoding apparatus 60 proceeds to step SP6 to perform difference calculation between hierarchies by the difference circuits 47, 45, 43, and 41, in order to quantize for thus generated inter-hierarchy difference data D44, D43, D42, and D41 by the quantization step width of the upper hierarchy.

At step SP7, the picture encoding apparatus 60 judges the distribution of the quantized values in the block. At step SP8, it executes judgment in accordance with the above rules 1-1 to 1-4, 2, and 3, to determine the quantization step width based on the judged result, and transmits it to the lower hierarchy.

At the succeeding step SP9, the picture encoding apparatus 40 encodes and decodes the inter-hierarchy difference data D44, D43, D42, and D41 by using the quantization step width determined in the step SP8.

At the step SP10, the picture encoding apparatus 60 decrements the hierarchy counter I, and at the succeeding step SP11, judges whether or not the hierarchy counter I is "0".

When an affirmative result is obtained, it means that the processing of all hierarchies has been completed, thus, the picture encoding apparatus 60 proceeds to step SP12 to terminate the processing. On the other hand, at the step SP11, if a negative result is obtained, the picture encoding apparatus 60 returns to the step SP5 to repeat the above processing of steps SP5 to SP10 for the hierarchy which is lower by one.

(4) Effects of the Second Embodiment

According to the above configuration, the gain G when the quantization step width p1 of the lower hierarchy is determined, is determined with reference to the selected historical information of the gain G in the upper hierarchy, so that a quantization step width which is adaptive in respective hierarchy data can be obtained. Therefore, the picture encoding apparatus 60 in which the deterioration of picture quality can be reduced, can be realized.

(5) Other embodiments of the Second Embodiment

Note that, in the embodiments described above, it has been described the case where the gains G of the quantization step width of the quantizers of all of the hierarchies is determined based on the rules 1-1 to 1-4, 2, and 3. However, this invention is not only limited to this, but the quantization step width may not be determined based on the rules 1-1 to 1-4, 2, and 3 among all of the hierarchies, but the using gain determined rule may be changed hierarchy by hierarchy.

That is, in the hierarchical-encoding, since the size of pictures are different among hierarchies, the view of the deterioration of picture quality is different from the coding efficiency among hierarchies, so it is considered that to use the same gain determining rule is unnecessary among all of the hierarchies. For example, in the lower hierarchy, when the quantization step width is determined by using the above rules 1-1 to 1-4, 2, and 3, in the upper hierarchy, the rules 1 to 3 may be used, thereby, the quantization step width corresponding to the view of the picture quality can be determined, and a picture encoding apparatus with high coding efficiency can be obtained.

Further, in the embodiment described above, as the gain determining rule to reflect the determined historical information of the quantization step width in the upper hierarchy to the quantization step width of the lower hierarchy, the rules 1 to 3, and 1-1 to 1-4 are used. However, this invention not only limited to this, but various rules can be used as a gain determined rule, so long as the determined historical information of the quantization step width in the upper hierarchy can be reflected to the quantization step width of the lower hierarchy.

In this case, the gain G for reflecting the determined historical information of the quantization step width in the upper hierarchy to the quantization step width of the lower hierarchy, which represents by function $W_i$ (H, p0). As a result, the quantization step width p1 of the lower hierarchy is represented by p1=$W_i$ (H, p0)×p0, by using the adjacent quantization step width p0 of the quantization step width of the upper hierarchy.

[3] Third Embodiment
(1) Picture Encoding Apparatus

Figure 18:
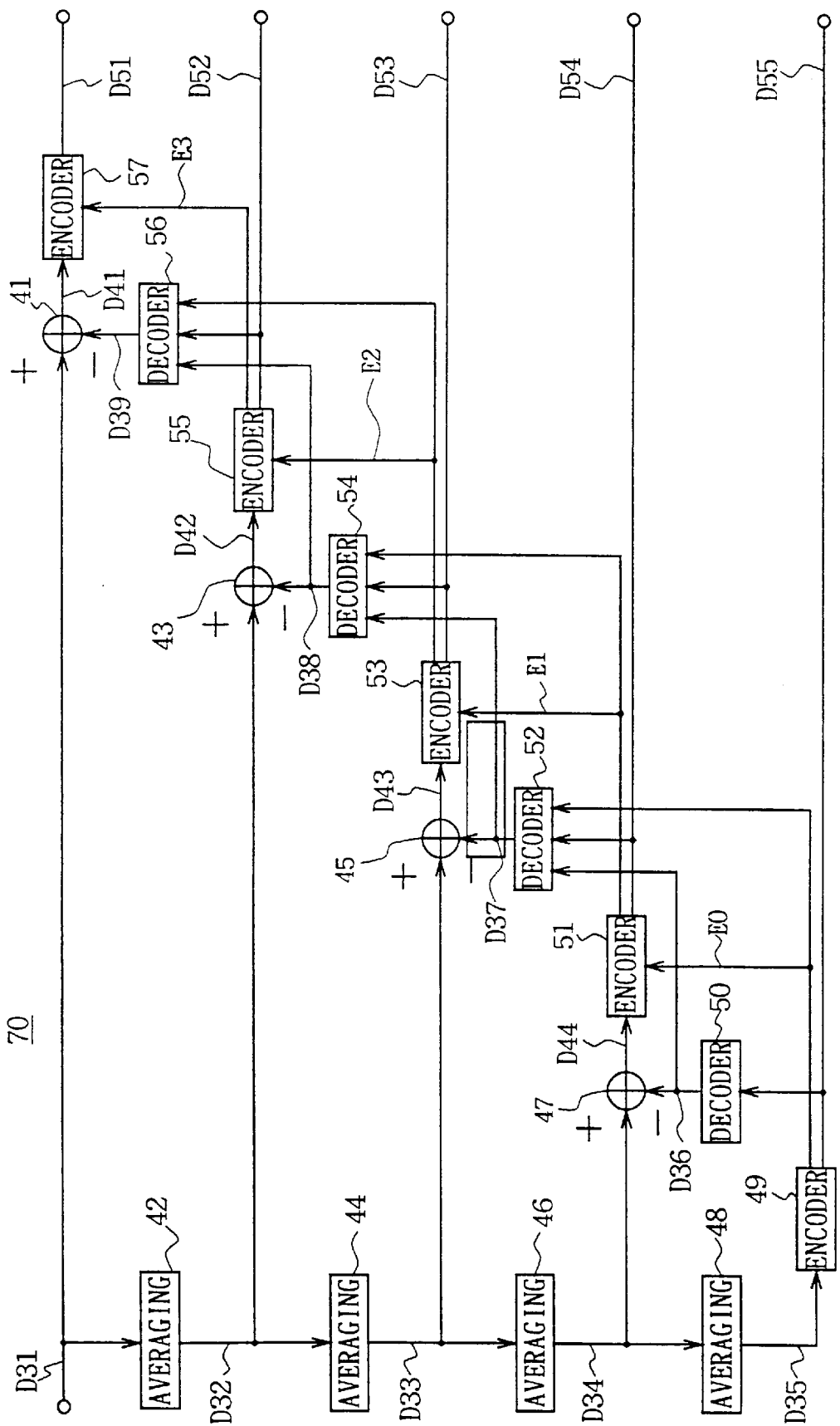
FIG. 18 is a block diagram showing the third embodiment of the picture encoding apparatus.
Figure 19:
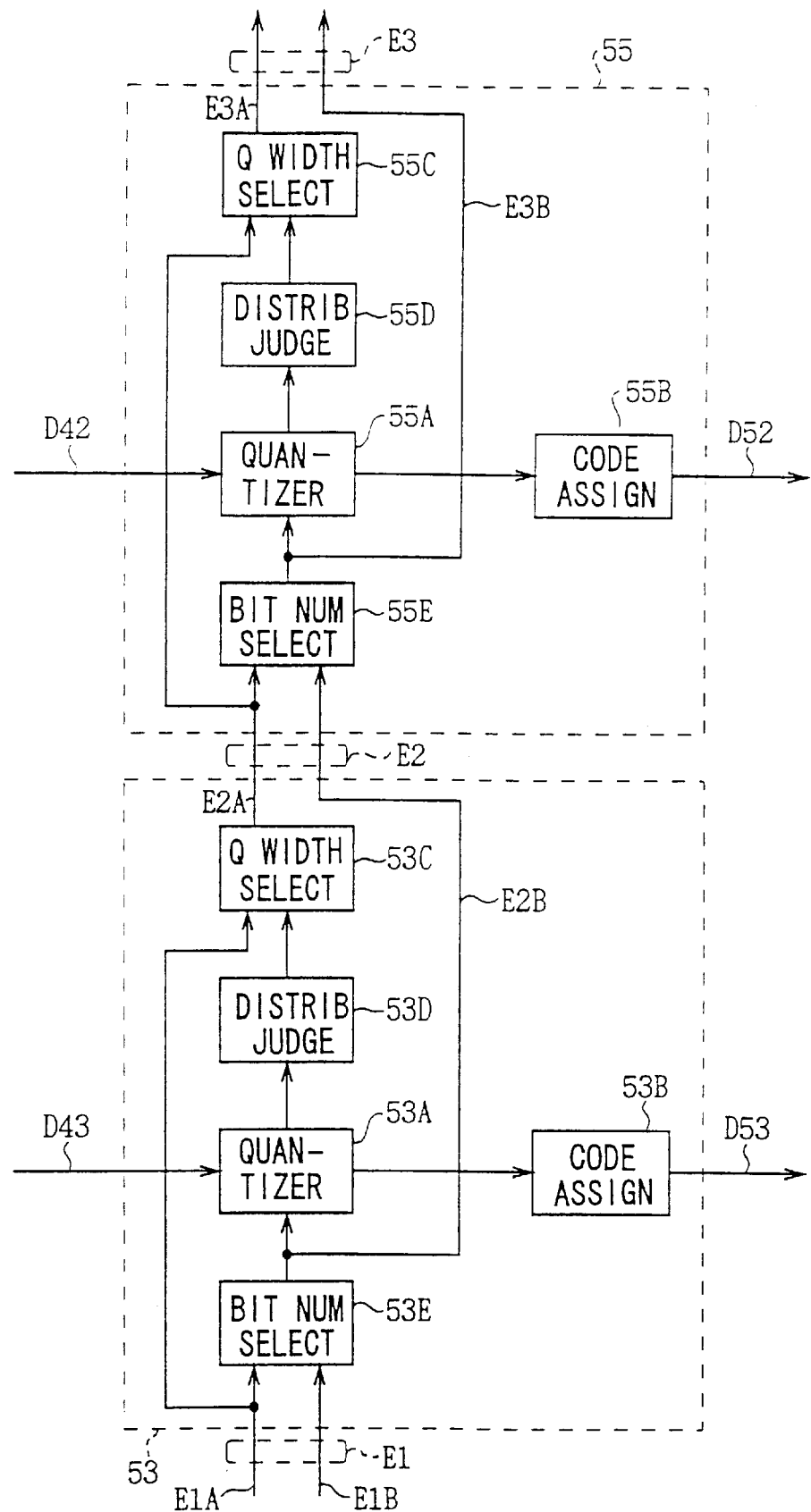
FIG. 19 is a block diagram showing the encoder of FIG. 18.

FIG. 18, in which the portions corresponding to those in FIG. 6 are designated with the same symbols, shows the third embodiment. As shown in FIG. 19, the encodes 51, 53, 55, and 57 have bit number selection circuit 53E, 55E, . . . .

To simplify, the construction of only encoders 53 and 55 are shown in FIG. 19, however, the encoders 51 and 57 have the same construction.

The encoder 53 receives the quantization step width information E1A and the quantization bit number information E1B as a quantization information E1, and inputs it to the bit number selection circuit 53E. The bit number selection circuit 53E determines the quantization bit number which is used in this hierarchy in accordance with the quantization step width information E1A, and gives the determined result to the quantizer 53A and the succeeding bit number selection circuit 55E. The quantizer 53A quantizes the inter-hierarchy data D43 by the quantization bit number obtained from the bit number selection circuit 53E, judges the distribution of obtained quantized value by the distribution judging circuit 53D, and gives the obtained judged result to the quantization width selection circuit 53C. The quantization width selection circuit 53C performs the same processing described in the first embodiment, so as to obtain new quantization step width information E2A, and outputs it to the encoder 55 of lower hierarchy.

Similarly, the encoder 55 receives the quantization step width information E2A and the quantization bit number information E2B from the adjacent encoder 53 of upper hierarchy as the quantization information E2, and generates the quantization bit number information E3B in response to the quantization step width information E2A by the bit number selection circuit 55E.

(2) Selection of Quantizing Bit Number

Practically, the bit number selection circuit 53D, 55E, . . . , denoting the quantization bit number of an upper hierarchy by bit0, denoting the quantization step width of the upper hierarchy by p0, and denoting the quantization bit number weight determining function of a lower hierarchy by f0(·), the quantization bit number bit1 of the lower hierarchy is obtained by following equation:

$$\text{bit1}=f0(p0)\times\text{bit0} \tag{7}$$

Figure 20:
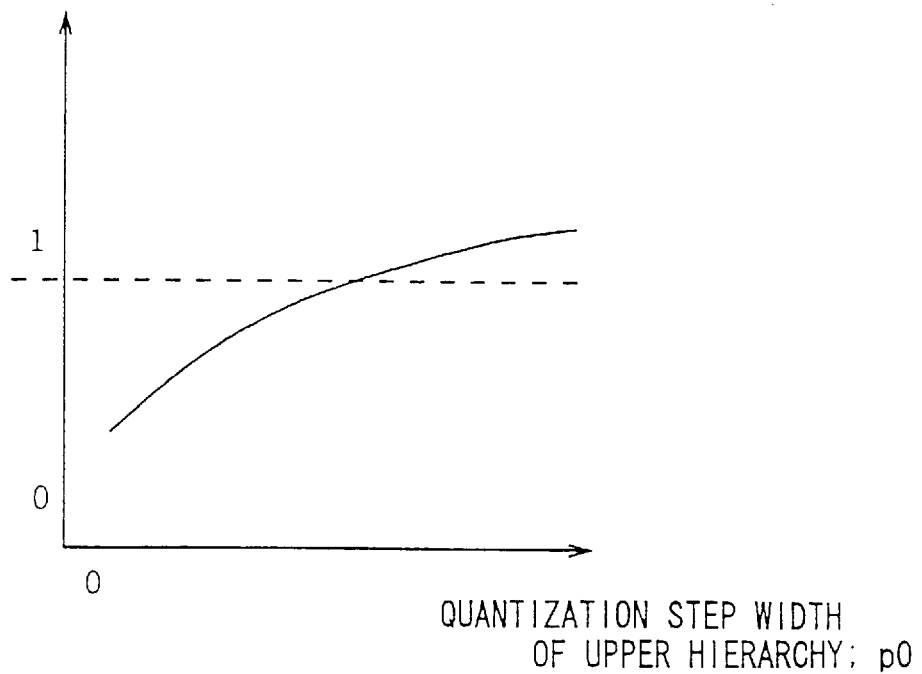
FIG. 20 is a characteristic curved diagram showing the characteristic of the quantization bit number weight determination function according to the third embodiment.

Here, the quantization bit number weight determining function f0(·) having the characteristic as shown in FIG. 20 is considered.

Therefore, in the picture encoding apparatus 70, when the quantization step width p0 of the upper hierarchy is larger, the quantization bit number of the lower hierarchy is kept or increased comparing with that of the upper hierarchy. When the quantization step width of the upper hierarchy is smaller, in the lower hierarchy, the quantization distortion reduces even if the quantization bit number is reduced, so the quantization bit number of the lower hierarchy is reduced comparing with that of the upper hierarchy.

In this manner, in the picture encoding apparatus 70, the quantization bit number is adaptively determined by using the relation between adjacent hierarchies, so as to reduce the transmitting bit number without generating the deterioration of the picture quality, and improving the compression efficiency. Further, thus determined quantization bit number can be determined in accordance with the combination of the transmitting data in decoding, so that an adding code indicating the quantization bit number may not be transmitted separately, and the compression efficiency does not change.

(3) Operation of the Third Embodiment

Figure 21:
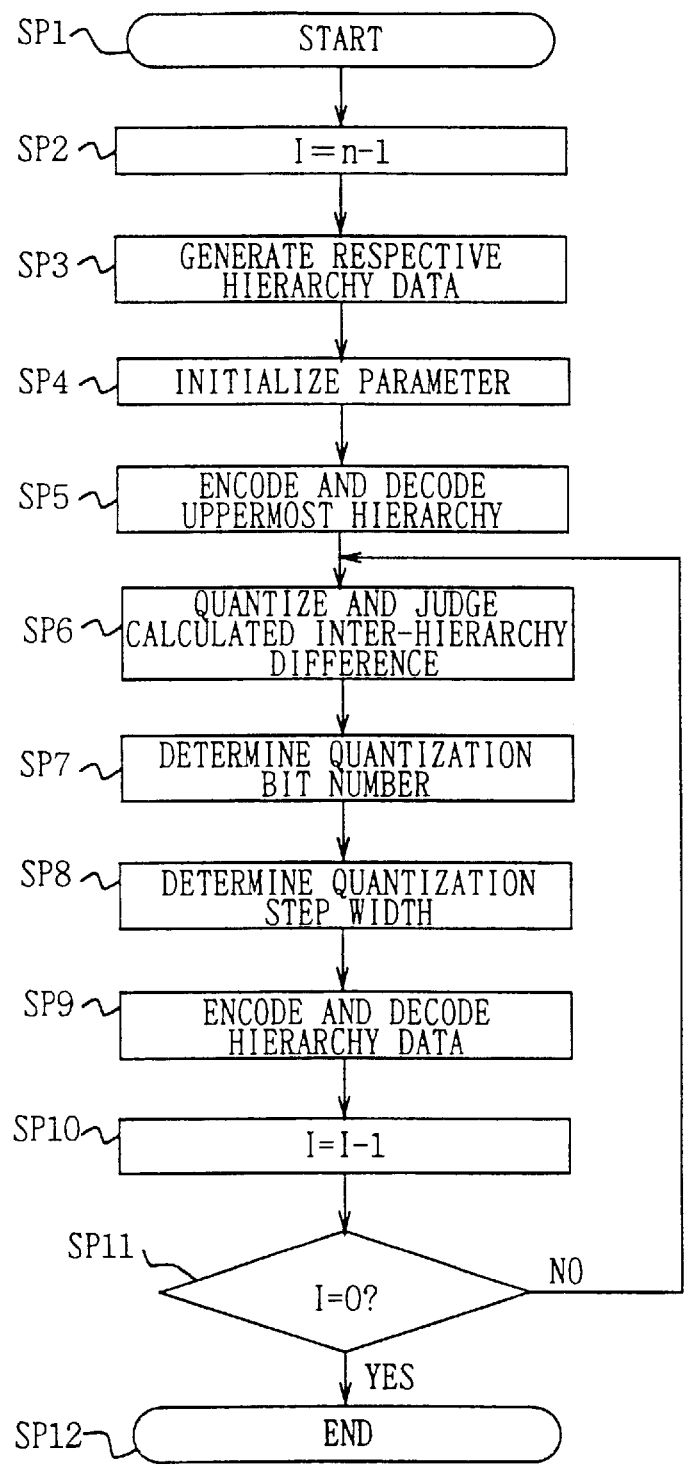
FIG. 21 is a flowchart explaining the operation of the third embodiment.

According to above configuration, the picture encoding apparatus 70 sequentially generates the first to the n-th hierarchy compression encoded data in accordance with the processing procedure such as shown in FIG. 21 (in the embodiment, n=5).

That is, the picture encoding apparatus 70 enters the processing from the step SP1, and at the succeeding step SP2, the picture encoding apparatus 70 images the n-th hierarchy so as to input "n−1" to the hierarchy counter I.

At the succeeding step SP3, the picture encoding apparatus 70 generates hierarchy data D31 to D35 for n-hierarchies by averaging circuits 42, 44, 46, and 48, and then proceeds to the step SP4 to set the initial value of the quantization step width belonging to the uppermost hierarchy and the quantization bit number used in judgment in following hierarchies. At the succeeding step SP5, the picture encoding apparatus 70 executes the encoding and decoding processing of the uppermost hierarchy data D35.

Next, the picture encoding apparatus 70 enters to the encoding loop to sequentially encode in each of the hierarchies. At the step SP6, the picture encoding apparatus 40 performs difference calculation between hierarchies by difference circuits 47, 45, 43, and 41, and then quantizes thus generated inter-hierarchy difference data D44, D43, D42, and D41 by the quantization step width of the upper hierarchy, and judges the distribution of the quantized values in the block at this time.

At the succeeding step SP7, the picture encoding apparatus 70 determines the quantization bit number by using the quantization step width of the upper hierarchy by the equation (7). Then, at the succeeding step SP8, the quantization step width is determined in accordance with the above rules 1 to 3 by using the distribution of the quantized values in the block.

At the succeeding step SP9, the picture encoding apparatus 70 encodes and decodes the inter-hierarchy difference data D44, D43, D42, and D41 by using the quantization bit number of the upper hierarchy and the quantization step width.

At the step SP10, the picture encoding apparatus 70 decrements the hierarchy counter I, and at the succeeding step SP11, judges whether or not the hierarchy counter I is "0".

When an affirmative result is obtained, it means that the processing of all hierarchies has been completed, thus, the picture encoding apparatus 70 proceeds to step SP12 to terminate the processing. On the other hand, at the step SP11, if a negative result is obtained, the picture encoding apparatus 70 returns to the step SP6 to repeat the above processing of steps SP6 to SP10 for the hierarchy which is lower by one.

(4) Effects of the Third embodiment

According to the above configuration, the quantization bit number of the respective hierarchies is determined corresponding to the quantization step width of an upper hierarchy, so that the transmitting bit number can be effectively reduced without deteriorating the picture quality, and a picture encoding apparatus 70 such that, the compression efficiency can be improved, can be realized.

(5) Other embodiments of the Third Embodiment (5-1) In the embodiment described above, it has been described the case where the quantization bit number of the respective hierarchies is determined corresponding to the quantization step width of the upper hierarchy. However, this invention is not only limited to this, but the quantization bit number of the respective hierarchies may be determined based on the distribution of the quantized values in the block in accordance with the quantization step width of the upper hierarchy.

In this case, denoting the quantization bit number of an upper hierarchy by bit0, denoting the quantization bit number of a lower hierarchy by bit1, the distribution parameter of the quantized values in a block by ptn, and a quantization bit number weight determining function of the lower hierarchy by f1(·), the determining method of the quantization bit number can be rep resented by th e following equation:

$$bit1 = f1)ptn) \times bit0 \qquad (8)$$

Figure 22:
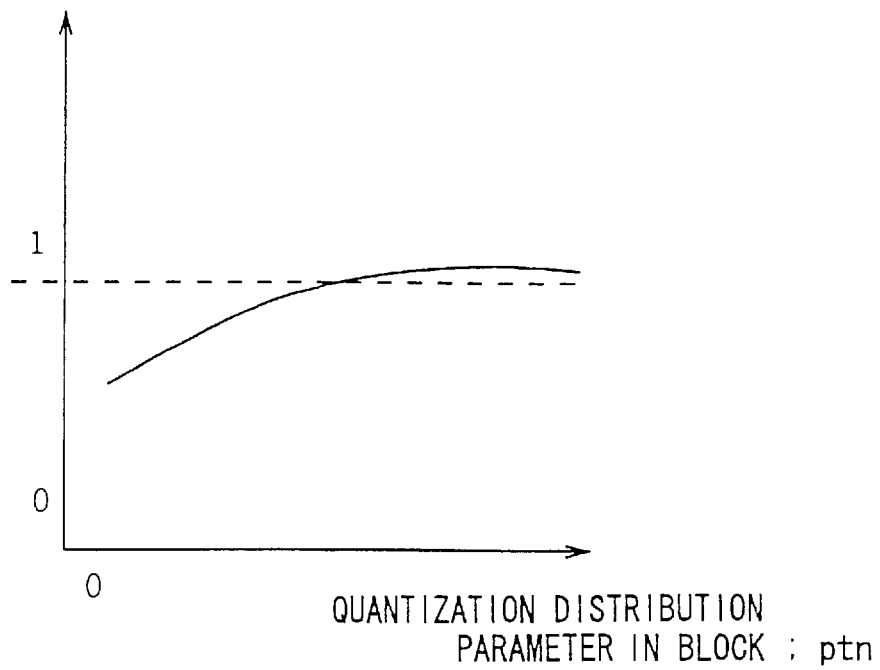
FIG. 22 is a characteristic curved diagram showing the characteristic of the quantization bit number weight determination function according to other embodiments.

Here, as the distribution parameter ptn of the quantized values in a block, the value indicating the activity of the data level distribution in the block is used as the pixel number included in the section B of FIG. 10. Further, the quantization bit number weight determining function f1(·) having the characteristic as shown in FIG. 22 is considered.

That is, when the activity of the data level distribution in the block is larger, the quantization bit number of the lower hierarchy is kept or increased comparing with that of the upper hierarchy. When the activity of the data level distribution in the block is smaller, in the lower hierarchy, the quantization distortion reduces even if the quantization bit number of the lower hierarchy is reduced comparing with that of the upper hierarchy.

Thereby, the amount of the transmitting data can be effectively reduced without deteriorating the picture quality same as the above embodiment.

Figure 23:
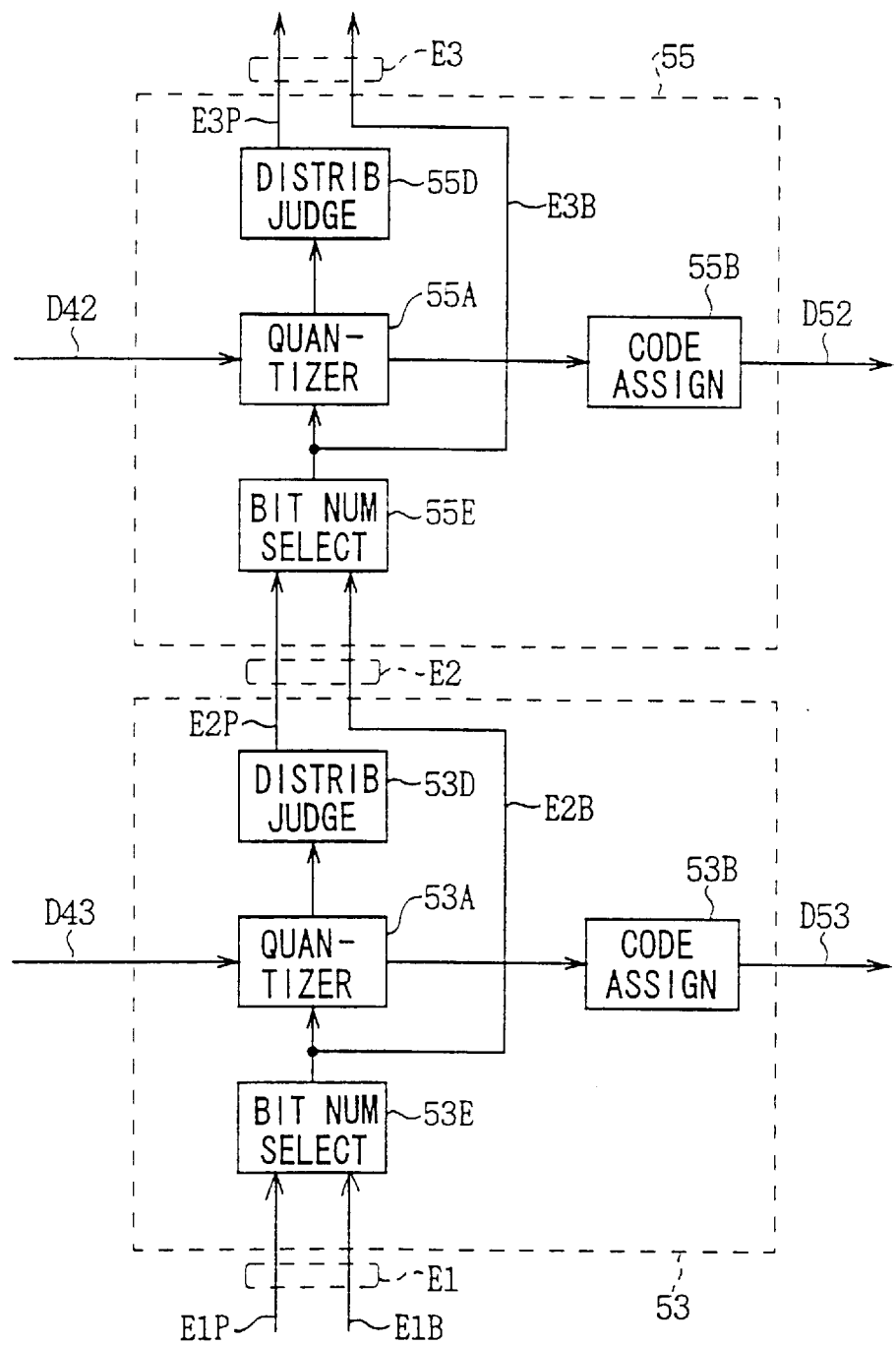
FIGS. 23 and 24 are block diagrams showing the encoder according to other embodiments.

FIG. 23 shows a concrete circuit configuration to realize the above. In FIG. 23 in which the portions corresponding to those of FIG. 19 are designated with the same symbols, the distribution judging circuits 53D and 55D generate the distribution parameter information E2P, E3P in accordance with the distribution condition of the quantized value. The bit number selection circuits 53E and 55E perform the equation (8) by using the obtained parameter information E1P, E2P and the quantization bit number information E1B, E2B, so as to determine the quantization bit number to be used to the quantization of the present hierarchy.

(5-2) Further, the quantization bit number of the respective hierarchies can be determined by combining the above two types of quantization bit number determining methods. That is, a method for determining the quantization bit number of the respective hierarchies in accordance with the quantization step width of the upper hierarchy and the distribution parameter of the quantized values in the block.

In this case, denoting the quantization bit number of an upper hierarchy by bit0, the quantization bit number of a lower hierarchy by bit1, the quantization step width of the upper hierarchy by p0, the distribution parameter of the quantized values in a block by ptn, and the quantization bit number weight determining function of the lower hierarchy by f2(·), the determining method of the quantization bit number is represented by following equation:

$$bit1 = f2(p0, ptn) \times bit0 \qquad (9)$$

Here, as the distribution parameter ptn of the quantized values in the block, the value indicating the activity of the data level distribution in the block, such as the pixel number included in the section B of FIG. 10, is considered. Further, in the quantization bit number weight determining function f2(·), the quantization step width p0 of the upper hierarchy and the distribution parameter ptn of the quantized values in the block are combined while keeping the fundamental characteristic of the above quantization bit number weight determining functions f0(·) and f1(·) (FIGS. 20 and 22), so that the condition of the quantization bit number weight determining characteristic become wider comparatively.

In the concrete, considering the distribution parameter ptn of the quantized values in the block, it is considered that the value of the quantization bit number weight is changed for the quantization bit number weight determined by the quantization step width p0 of the upper hierarchy.

Thereby, it can avoid to select the extreme quantization bit number, and the quantization bit number selecting control can be stabilized. The parameter of the weight determining function increases, as the fine quantization bit number can be obtained.

Figure 24:
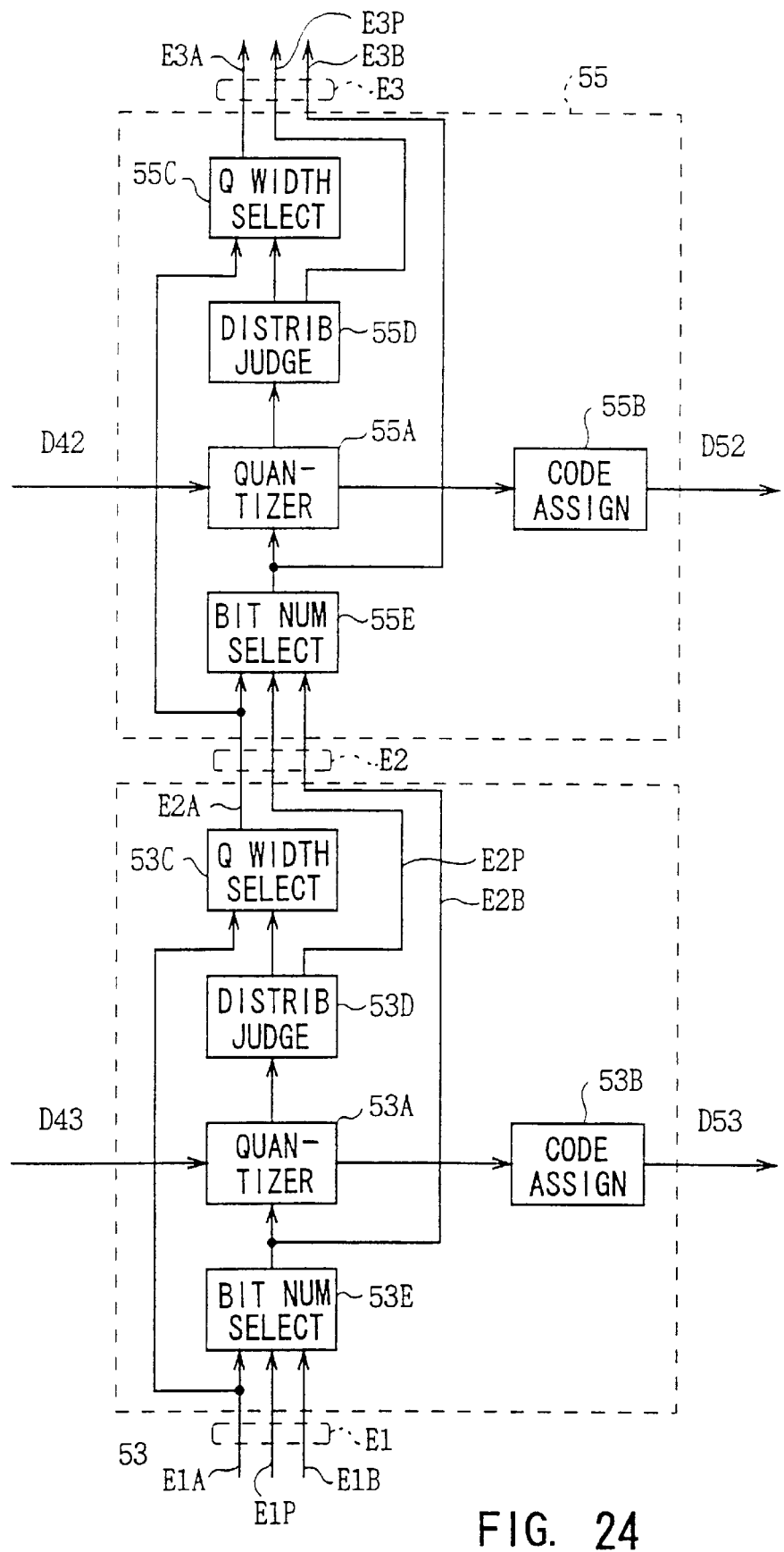

FIG. 24 shows a concrete circuit configuration to realize the above. In FIG. 24 in which the portions corresponding to those of FIG. 19 are designated with the same symbols, the distribution judging circuits 53D and 55D generate the judged result indicated by the rules 1 to 3 and the distribution parameter information E2P, E3P in accordance with the distribution condition of the quantized value. The bit number selection circuits 53E and 55E perform the equation (9) by using the quantization step width information E1A, E2A given from the encoder of upper hierarchy, the parameter information E1P, E2P and the quantization bit number information E1B, E2B, so as to determine the quantization bit number to be used to the quantization of the present hierarchy.

[4] Fourth Embodiment (1) Picture Encoding Apparatus

Figure 25:
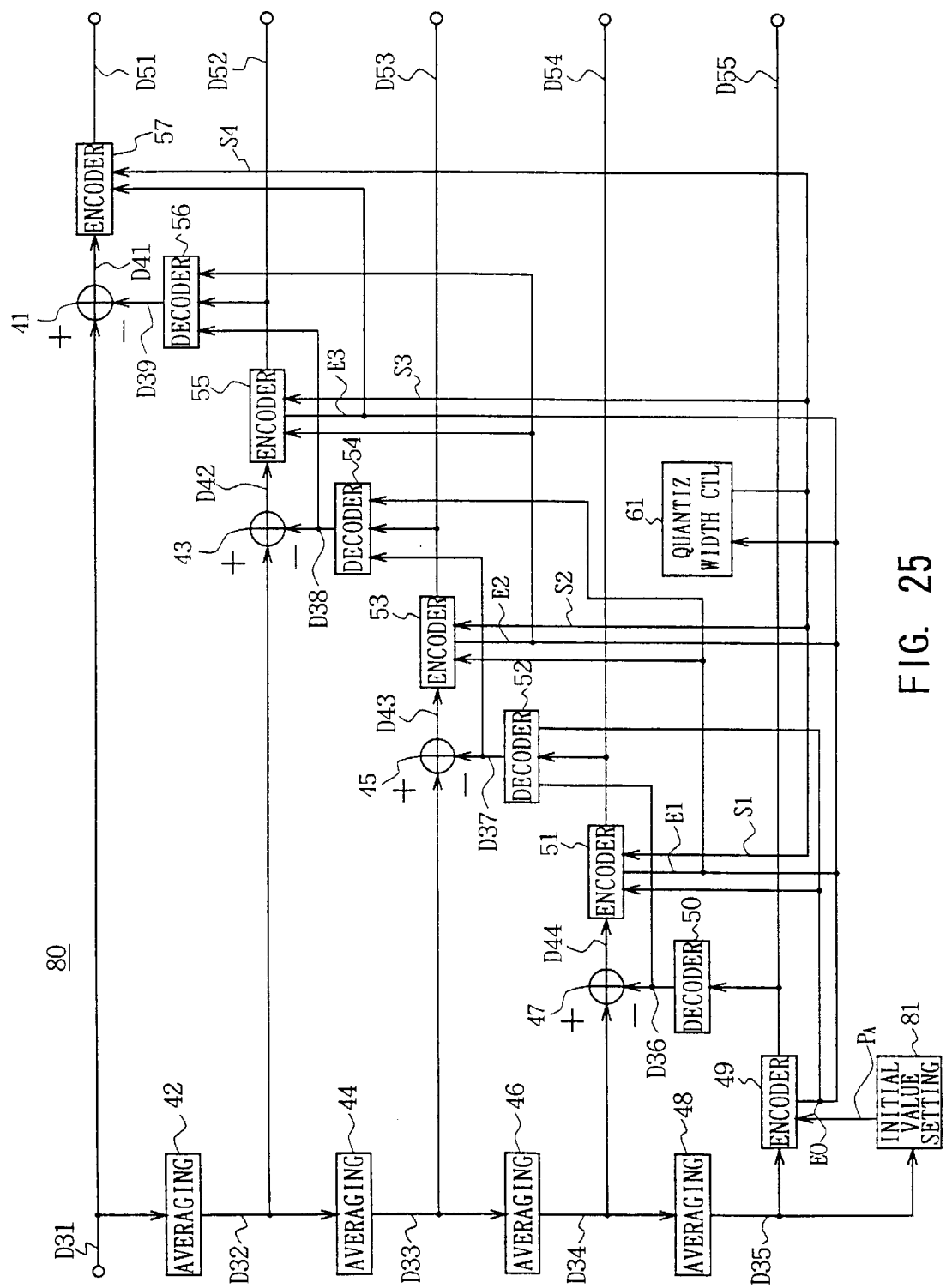
FIG. 25 is a block diagram showing the fourth embodiment of the picture encoding apparatus.

FIG. 25 in which the portions corresponding to those of FIG. 15 are designated with the same symbols, shows the fourth embodiment. The picture encoding apparatus 80 has an initial value setting circuit 81 for setting the quantization step width $P_A$ in the encoder 49 of the uppermost hierarchy.

(2) Selection of the Initial Value of the Quantization Step Width

In the picture encoding apparatus 80, it is necessary to set the quantization step width $P_A$ in the fifth hierarchy data D35 (i.e., the uppermost hierarchy data) (hereinafter, it is called as "the initial value of the quantization step width"). As the initial value $P_A$ of the quantization step width, the fixed value, for example, 32, is considered in 2-bit quantizing. However, it depends on quantizing bit number to be set.

In the embodiment, in the picture encoding apparatus 80, the initial value $P_A$ of the quantization step width adaptive to the picture is set as follows, so that the deterioration of the picture quality in quantization can be reduced comparatively.

Figures 26, 28:
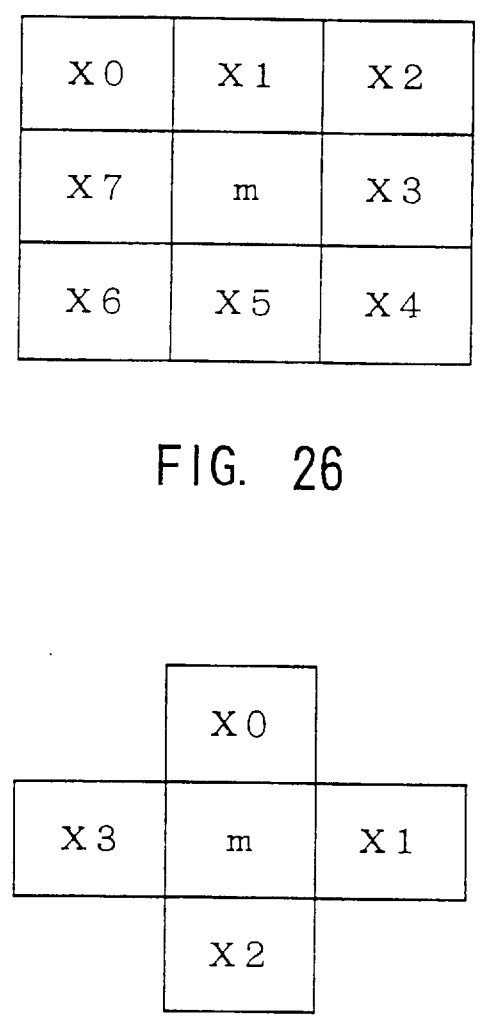

That is, in the picture encoding apparatus 80, as shown in FIG. 26, the initial value $P_A$ is determined in accordance with the relation between the remark data "m" in the uppermost hierarchy in which the initial value $P_A$ of the quantization step width is set, and the vicinity data X0 to X7 of the remark data "m".

In the concrete, denoting the remark data value by m, and denoting the vicinity 8-data value by $X_i$ (i=0 to 7), the initial value $P_A$ of the quantization step width is obtained by the following equation:

$$P_A = \frac{1}{4} \times \frac{\sum_{i=0}^{i=7} |X_i - m|}{8} \tag{10}$$

Here, the coefficient ¼ in the equation (10) corresponds to the four codes of 2-bit. In the equation (10), the mean difference value between the remark data "m" in the uppermost hierarchy and the vicinity data $X_i$ (i=0 to 7) is assumed to be the quantized object section.

(3) Operation of the Embodiment

Figure 27:
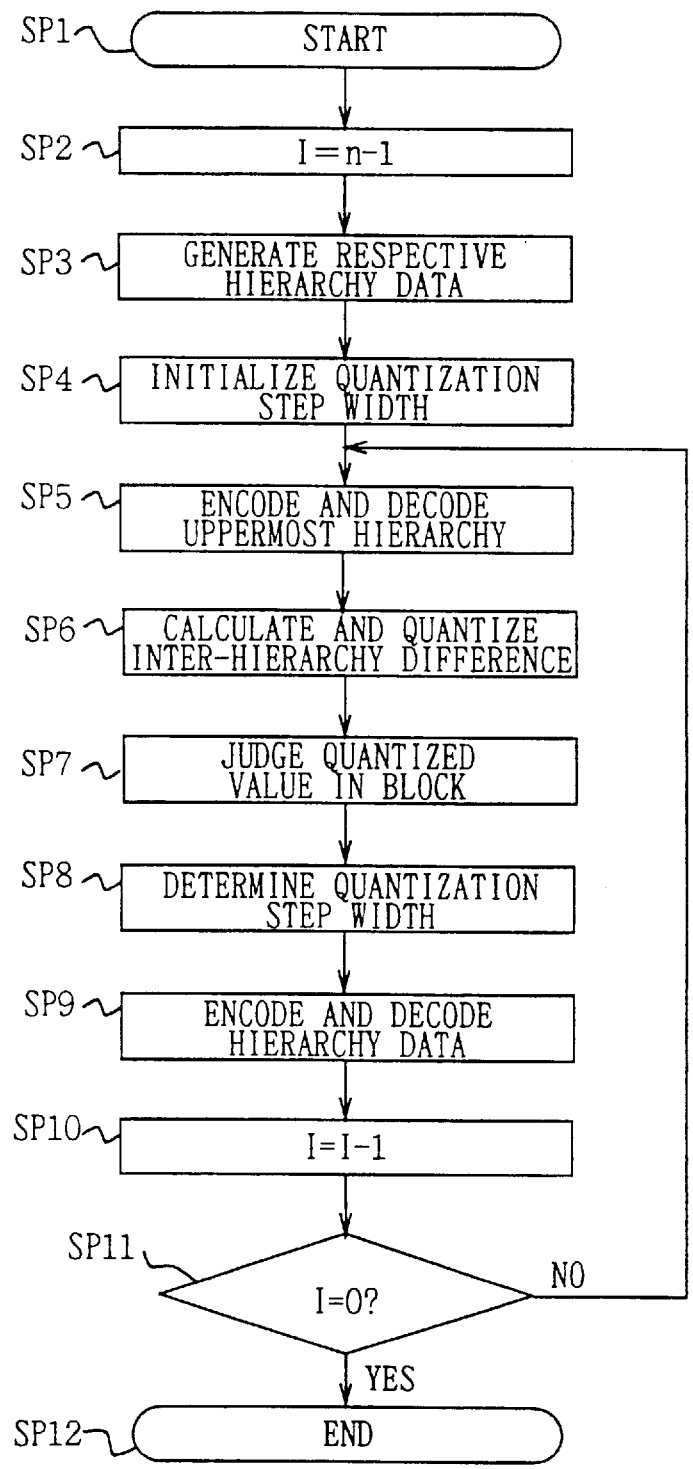
FIG. 27 is a flowchart explaining the operation of the hierarchy encoding according to the fourth embodiment.

According to above configuration, the picture encoding apparatus 80 sequentially generates the first to the n-th hierarchy compression encoded data in accordance with the processing procedure such as shown in FIG. 27 (in the embodiment, n=5).

That is, the processing enters from the step SP1, and at the succeeding step SP2, the picture encoding apparatus 80 images the n-th hierarchy so as to input "n−1" to the hierarchy counter I.

At the succeeding step SP3, the picture encoding apparatus 80 generates hierarchy data D31 to D35 for n-hierarchies by averaging circuits 42, 44, 46, and 48, and then proceeds to the step SP4.

At this time, the picture encoding apparatus 80 sets the initial value $P_A$ of the quantization step width having the property of the uppermost hierarchy by using the above method.

At the succeeding step SP5, the picture encoding apparatus 80 executes the encoding and decoding processing of the uppermost hierarchy data D35.

Next, the picture encoding apparatus 80 proceeds to the step SP6 to calculate inter-hierarchy difference by the difference circuit 47, 45, 43, or 41, and quantizes thus generated inter-hierarchy difference data D44, D43, D42, or D41 by the quantization step width of the upper hierarchy.

At the step SP7, the picture encoding apparatus 80 judges the distribution of the quantized values in a block, and at the succeeding step SP8, executes the judgment in accordance with the above rules 1-1 to 1-4, 2, and 3 described in the second embodiment to determine the quantization step width in accordance with the judged result, and transmits it to a lower hierarchy.

At the succeeding step SP9, the picture encoding apparatus 80 encodes and decodes the inter-hierarchy difference data D44, D43, D42, or D41 by using the quantization step width determined at the step SP8.

At the step SP10, the picture encoding apparatus 80 decrements the hierarchy counter I, and at the succeeding step SP11, judges whether or not the hierarchy counter I is "0".

When an affirmative result is obtained, it means that the processing of all hierarchies has been completed, thus, the picture encoding apparatus 80 proceeds to step SP12 to terminate the processing. On the other hand, at the step SP11, if a negative result is obtained, the picture encoding apparatus 80 returns to the step SP5 to repeat the above processing of steps SP5 to SP10 for the hierarchy which is lower by one.

(4) Effects of the embodiment

According to the above configuration, the initial value $P_A$ of the quantization step width "p" is selected in accordance with the mean difference value between the remark data "m" and the vicinity data $X_i$ (i=0 to 7) adjacent to the remark data "m", so that a picture encoding apparatus 80 such that, the deterioration of the picture quality in quantization can be reduced, can be realized.

(5) the Other embodiments (5-1) Note that, in the above embodiment, it has been described the case where the initial value $P_A$ of the quantization step width is selected in accordance with the remark data "m" in the uppermost hierarchy and eight vicinity data X0 to X7 adjacent to the remark data "m". However, this invention is not only limited to this, but for example, as shown in FIG. 25, the remark data "m" in the uppermost hierarchy, and the four vicinity data X1, X3, and X0, X2 which are adjacent to the remark data "m" in the horizontal and vertical directions, may be used.

In this case, denoting the remark data value by "m", and four vicinity data values by $X_i$ (i=0 to 3), the initial value $P_A$ of the quantization step width can be obtained by following equation:

$$P_A = \frac{1}{4} \times \frac{\sum_{i=0}^{i=3} |X_i - m|}{4} \tag{11}$$

Here, the coefficient ¼ in the equation (11) corresponds to the four codes of 2-bit. The fundamental way of thinking is the same as the case using the adjacent eight 8 data, however, since the vicinity four data are used, the parameter of division become 4.

(5-2) Further, in the above embodiment, it has been described the case where the initial value $P_A$ of the quantization step width is obtained by using the 2-bit quantizer and the eight vicinity data $X_i$ (i=0 to 7) adjacent to the remark data "m". However, this invention is not only limited to this, but the coefficient of the equation (10) is changed to an inverse number of the quantization code number corresponding to the quantizing bit number, and the vicinity data number which is necessary to the parameter of division is used, so that the initial value $P_A$ can be widely set.

That is, denoting the quantizing bit number of the quantizer by "k", denoting the remark data value by "m", and denoting the vicinity n data value by $X_i$ (i=0 to n−1), the initial value $P_A$ of the quantization step width can be obtained by the following equation:

$$P_A = \frac{1}{2^k} \times \frac{\sum_{i=0}^{i=n-1} |X_i - m|}{n} \tag{12}$$

Figure 29:
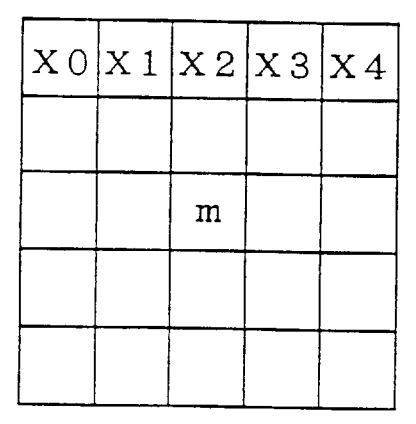

(5-3) Further, in the above embodiments, it has been described the case where the initial value $P_A$ is obtained by using the vicinity data adjacent to the remark data "m". However, this invention is not only limited to this, but as shown in FIG. 29, the initial value $P_A$ may be obtained in accordance with the picture data X0 to X5 distant from the remark data "m" for the predetermined distance.

In this case, denoting the quantizing bit number of the quantizer by "k", the remark data value by "m", the number of reference picture data by "n", the reference picture data value by $X_i$ (i=0 to 4), and the spatial distance weight between the remark picture data "m" and each of the reference picture data $X_i$ by $w_i$ (i=0 to 4), the initial value $P_A$ of the quantization step width can be obtained by the following equation:

$$P_A = \frac{1}{2^k} \times \frac{\sum_{i=0}^{i=n-1} w_i \cdot |X_i - m|}{n} \quad (13)$$

(5-4) Further, in this invention, the upper hierarchy data may be generated vertically for the uppermost hierarchy data in which the initial value $P_A$ of the quantization step width is set, to generate the initial value $P_A$ of the quantization step width based on calculation between the vertical upper hierarchy data and a plural number of pixels in the uppermost hierarchy data corresponding to the above vertical upper hierarchy data.

An example of the arrangement of the vertical upper hierarchy data and the uppermost hierarchy data is shown in FIGS. 30A and 30B. In the example, the vertical upper hierarchy data M (FIG. 30A) is generated in accordance with the uppermost hierarchy data (FIG. 30B) by four pixels averaging processing same as another hierarchy data generating method.

Here, when the 2-bit quantizer is used as a quantizer, denoting the vertical upper hierarchy data value by "M", and the uppermost hierarchy data value by $X_i$ (i=0 to 3), the initial value $P_A$ of the quantization step width can be obtained by the following equation:

$$P_A = \frac{1}{4} \times \frac{\sum_{i=0}^{i=3} |X_i - M|}{4} \times 2 \quad (14)$$

Note that, the coefficient ¼ of the equation (14) corresponds to the four codes of 2-bit, and since using the four data of the uppermost hierarchy, the parameter of division become 4.

In this case, it is considered fundamentally that the range of fluctuation is set to the quantized section. Because the quantized section is quantized by a quantizing bit number, the quantizing bit number increases, as the quantization step width become narrow.

Considering this method in general, the coefficient is changed to an inverse number of the quantization code number corresponding to the quantizing bit number, and the data number of the uppermost hierarchy concerning with generation of the vertical upper hierarchy data is set to the parameter of division, so that the initial value $P_A$ can be widely set. That is, denoting the quantizing bit number by "k", denoting the vertical upper hierarchy data value by "M", and denoting the concerning uppermost hierarchy data value by $X_i$ (i=0 to n-1), the initial value $P_A$ of the quantization step width can be obtained by the following equation:

$$P_A = \frac{1}{2^k} \times \frac{\sum_{i=0}^{i=n-1} |X_i - M|}{n} \times 2 \quad (15)$$

Industrial Applicability

A picture encoding apparatus and the method of this invention can be utilized as a transmitter of a system having monitors of which resolution are different at the receiving side, such as a television conference system or a video on demand system.

We claim:

1. A picture encoding apparatus for encoding inputted picture data to generate a plurality of layers of hierarchy data having a plurality of resolutions which are recursively different, comprising:

first determining means for determining quantization characteristics which include at least one of a quantization step width and a quantization bit number for low hierarchy data having a resolution higher than that of upper hierarchy data which has a low resolution based on the activity of said upper hierarchy data;

second determining means for determining quantization characteristics which include at least one of a quantization step width and a quantization bit number for only uppermost hierarchy data having the lowest resolution by using the pixel value of the pixel to be quantized of the uppermost hierarchy data and a number of pixel values around the pixel to be quantized; and quantizing means for quantizing each of the hierarchy data in accordance with said determined quantization characteristics of each hierarchy.

2. The picture encoding apparatus according to claim 1, wherein:

said quantizing means comprises first quantizing means for quantizing said low hierarchy data in accordance with the first quantization characteristics, and second quantizing means for quantizing said uppermost hierarchy data in accordance with the second quantization characteristics.

3. The picture encoding apparatus according to claim 2, wherein said second determining means determines the quantization step width by calculating the pixel value of the pixel to be quantized of said uppermost hierarchy data and the pixel value of four pixels adjacent to the pixel to be quantized in horizontal and vertical directions.

4. The picture encoding apparatus according to claim 2, wherein said second determining means determines the quantization step width by calculating the pixel value of the pixel to be quantized of said uppermost hierarchy data and the pixel value of eight pixels adjacent to the pixel to be quantized.

5. The picture encoding apparatus according to claim 2, wherein said first determining means determines, for each block of hierarchy data, the quantization step width for said low hierarchy data based on the quantization step width of said upper hierarchy data.

6. The picture encoding apparatus according to claim 2, wherein each hierarchy data excepting data at the uppermost hierarchy is a hierarchy difference data which is a difference between the hierarchy data and the upper hierarchy data.

7. The picture encoding apparatus according to claim 2, further comprising means for generating upper hierarchy data having a low resolution from the low hierarchy data having a high resolution wherein:

said generating means calculates, for each block of hierarchy data, the average of n pixel values (where n is an integer) in a block to generate the upper hierarchy data; and the upper hierarchy data being the average and the low hierarchy data being the pixels having the number of n−1 in a block corresponding to the average are output as the encoded data.

8. The picture encoding apparatus according to claim 7, wherein each hierarchy data excepting data at the uppermost hierarchy is a hierarchy difference data which is a difference between the hierarchy data and the upper hierarchy data.

9. A picture transmitting method for encoding inputted picture data to generate a plurality of layers of hierarchy data having a plurality of resolutions which are recursively different, comprising:

first determining step of determining quantization characteristics which include at least one of a quantization step width and a quantization bit number for low hierarchy data having a resolution higher than that of upper hierarchy data which has a low resolution based on the activity of said upper hierarchy data;

second determining step of determining quantization characteristics which include at least one of a quantization step width and a quantization bit number for only uppermost hierarchy data having the lowest resolution by using the pixel value of the pixel to be quantized of the uppermost hierarchy data and a number of pixel values around the pixel to be quantized; and quantizing step of quantizing each of the hierarchy data in accordance with said determined quantization characteristics of each hierarchy.

10. The picture transmitting method according to claim 9, wherein:

said quantizing step comprises a first quantizing step of quantizing said low hierarchy data in accordance with the first quantization characteristics, and a second quantizing step of quantizing said uppermost hierarchy data in accordance with the second quantization characteristics.

11. The picture transmitting method according to claim 10, wherein said second determining step determines the quantization step width by calculating the pixel value of the pixel to be quantized of said uppermost hierarchy data and the pixel value of four pixels adjacent to the pixel to be quantized in horizontal and vertical directions.

12. The picture transmitting method according to claim 10, wherein said second determining step determines the quantization step width by calculating the pixel value of the pixel to be quantized of said uppermost hierarchy data and the pixel value of eight pixels adjacent to the pixel to be quantized.

13. The picture transmitting method according to claim 10, wherein said first determining step determines, for each block of hierarchy data, the quantization step width for said low hierarchy data based on the quantization step width of said upper hierarchy data.

14. The picture transmitting method according to claim 10, wherein each hierarchy data excepting data at the uppermost hierarchy is a hierarchy difference data which is a difference between the hierarchy data and the upper hierarchy data.

15. The picture transmitting method according to claim 10, further comprising the step of generating upper hierarchy data having a low resolution from the low hierarchy data having a high resolution wherein:

said generating step calculates, for each block of hierarchy data, the average of n pixel values (where n is an integer) in a block to generate the upper hierarchy data; and said transmitting step transmits the upper hierarchy data being the average and the low hierarchy data being the pixels having the number of n−1 in a block corresponding to the average as the encoded data.

16. The picture transmitting method according to claim 15, wherein each hierarchy data excepting data at the uppermost hierarchy is a hierarchy difference data which is a difference between the hierarchy data and the upper hierarchy data.

17. A picture encoding method for encoding inputted picture data to generate a plurality of layers of hierarchy data having a plurality of resolutions which are recursively different, comprising:

a first determining step of determining quantization characteristics which include at least one of a quantization step width and a quantization bit number for low hierarchy data having a resolution higher than that of upper hierarchy data which has a low resolution based on the activity of said upper hierarchy data;

a second determining step of determining quantization characteristics which include at least one of a quantization step width and a quantization bit number for only uppermost hierarchy data having the lowest resolution by using the pixel value of the pixel to be quantized of the uppermost hierarchy data and a number of pixel values around the pixel to be quantized; and a quantizing step of quantizing each of the hierarchy data in accordance with said determined quantization characteristics of each hierarchy.

18. The picture encoding method according to claim 17, wherein:

said quantizing step comprises a first quantizing step of quantizing said low hierarchy data in accordance with the first quantization characteristics, and a second quantizing step of quantizing said uppermost hierarchy data in accordance with the second quantization characteristics.

19. The picture encoding method according to claim 18, wherein said second determining step determines the quantization step width by calculating the pixel value of the pixel to be quantized of said uppermost hierarchy data and the pixel value of four pixels adjacent to the pixel to be quantized in horizontal and vertical directions.

20. The picture encoding method according to claim 18, wherein said second determining step determines the quantization step width by calculating the pixel value of the pixel to be quantized of said uppermost hierarchy data and the pixel value of eight pixels adjacent to the pixel to be quantized.

21. The picture encoding method according to claim 18, wherein said first determining step determines, for each block of hierarchy data, the quantization step width for said low hierarchy data based on the quantization step width of said upper hierarchy data.

22. The picture encoding method according to claim 18, wherein each hierarchy data excepting data at the uppermost hierarchy is a hierarchy difference data which is a difference between the hierarchy data and the upper hierarchy data.

23. The picture encoding method according to claim 18, further comprising the step for generating upper hierarchy data having a low resolution from the low hierarchy data having a high resolution wherein:

said generating step calculates, for each block of hierarchy data, the average of n pixel values (where n is an integer) in a block to generate the upper hierarchy data; and the upper hierarchy data being the average and the low hierarchy data being the pixels having the number of n−1 in a block corresponding to the average are output as the encoded data.

24. The picture encoding method according to claim 23, wherein each hierarchy data excepting data at the uppermost hierarchy is a hierarchy difference data which is a difference between the hierarchy data and upper hierarchy data.

* * * * *